United States Patent
Yamazaki et al.

(10) Patent No.: US 9,975,240 B2
(45) Date of Patent: May 22, 2018

(54) ROBOT, CONTROLLER, AND ROBOT SYSTEM

(71) Applicant: Seiko Epson Corporation, Tokyo (JP)

(72) Inventors: Takema Yamazaki, Fujimi (JP); Izumi Iida, Shiojiri (JP); Munenori Sawada, Matsumoto (JP); Daisuke Sato, Chino (JP); Isamu Sejimo, Matsumoto (JP); Shigenori Sasai, Azumino (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 14/529,542

(22) Filed: Oct. 31, 2014

(65) Prior Publication Data

US 2015/0127147 A1  May 7, 2015

(30) Foreign Application Priority Data

| Nov. 1, 2013 | (JP) | 2013-227972 |
| Nov. 1, 2013 | (JP) | 2013-227973 |
| Nov. 5, 2013 | (JP) | 2013-229061 |
| Nov. 5, 2013 | (JP) | 2013-229062 |
| Jan. 16, 2014 | (JP) | 2014-005697 |

(51) Int. Cl.
*B25J 9/16* (2006.01)
*B25J 15/00* (2006.01)
*B25J 13/08* (2006.01)
*B25J 19/00* (2006.01)

(52) U.S. Cl.
CPC .......... *B25J 9/1602* (2013.01); *B25J 9/1682* (2013.01); *B25J 13/088* (2013.01); *B25J 15/00* (2013.01); *B25J 19/0029* (2013.01); *Y10S 901/09* (2013.01)

(58) Field of Classification Search
CPC ...... B25J 9/1602; B25J 9/1682; B25J 13/088; B25J 15/00; B25J 19/0029; Y10S 901/09
USPC .............................. 700/248, 249, 258; 901/9
See application file for complete search history.

(56) References Cited

U.S. PATENT DOCUMENTS

| 5,823,061 A | 10/1998 | Tomiyasu |
| 7,415,321 B2 | 8/2008 | Okazaki et al. |
| 7,765,023 B2 | 7/2010 | Oaki et al. |
| 2004/0164697 A1 | 8/2004 | Iribe |

(Continued)

FOREIGN PATENT DOCUMENTS

| JP | 60-020214 A | 2/1985 |
| JP | 02-198789 A | 8/1990 |

(Continued)

OTHER PUBLICATIONS

Extended European Search Report for Application No. 14191051.3 dated Mar. 25, 2015 (7 pages).

(Continued)

*Primary Examiner* — Khoi H Tran
*Assistant Examiner* — Robert T Nguyen
(74) *Attorney, Agent, or Firm* — Harness, Dickey & Pierce, P.L.C.

(57) ABSTRACT

A robot includes a robot arm, a drive unit that drives the robot arm, a first control unit that controls drive of the drive unit, a plurality of detection units at least one of which is an angular velocity sensor as an inertial sensor, and a wiring unit that series-connects the plurality of detection units and the first control unit.

8 Claims, 12 Drawing Sheets

(56) References Cited

U.S. PATENT DOCUMENTS

| | | | |
|---|---|---|---|
| 2005/0240307 A1* | 10/2005 | Kuroki | B25J 13/085 700/245 |
| 2006/0043508 A1 | 3/2006 | Ohta et al. | |
| 2007/0205475 A1 | 9/2007 | Ohta et al. | |
| 2008/0289432 A1 | 11/2008 | Ohta et al. | |
| 2010/0126271 A1* | 5/2010 | Inukai | G01C 19/5607 73/504.12 |
| 2010/0185325 A1* | 7/2010 | Kwon | G05B 19/4141 700/245 |
| 2012/0004774 A1* | 1/2012 | Umetsu | B25J 5/007 700/254 |
| 2012/0035763 A1 | 2/2012 | Motoyoshi | |
| 2012/0048027 A1 | 3/2012 | Hashiguchi et al. | |
| 2012/0179294 A1 | 7/2012 | Sasai | |
| 2012/0215358 A1* | 8/2012 | Gettings | B25J 5/005 700/259 |
| 2012/0296472 A1* | 11/2012 | Nagai | B25J 9/1612 700/258 |
| 2014/0152096 A1* | 6/2014 | Nagatsuka | H02P 31/00 307/18 |
| 2015/0057961 A1* | 2/2015 | Montoya | G06F 11/2294 702/121 |
| 2015/0190928 A1 | 7/2015 | Motoyoshi | |
| 2017/0080572 A1 | 3/2017 | Motoyoshi | |

FOREIGN PATENT DOCUMENTS

| | | |
|---|---|---|
| JP | 05-57664 A | 3/1993 |
| JP | 05-080848 A | 4/1993 |
| JP | 05-134724 A | 6/1993 |
| JP | 07-124883 A | 5/1995 |
| JP | 08-168990 A | 7/1996 |
| JP | 09-150389 A | 6/1997 |
| JP | 10-332446 A | 12/1998 |
| JP | H11-010580 A | 1/1999 |
| JP | 11-300681 A | 11/1999 |
| JP | 2000-305959 A | 11/2000 |
| JP | 2001-147706 A | 5/2001 |
| JP | 2002-079487 A | 3/2002 |
| JP | 2002-144277 A | 5/2002 |
| JP | 2004-001195 A | 1/2004 |
| JP | 2004-088208 A | 3/2004 |
| JP | 2004-178081 A | 6/2004 |
| JP | 2004-188535 A | 7/2004 |
| JP | 2004-303842 A | 10/2004 |
| JP | 2005-066742 A | 3/2005 |
| JP | 2005-114443 A | 4/2005 |
| JP | 2005-161414 A | 6/2005 |
| JP | 2005-242794 A | 9/2005 |
| JP | 2006-281348 A | 10/2006 |
| JP | 2007-118176 A | 5/2007 |
| JP | 2008-064528 A | 3/2008 |
| JP | 2008-126328 A | 6/2008 |
| JP | 2008126328 A * | 6/2008 |
| JP | 2009-279663 A | 12/2009 |
| JP | 2011-020188 A | 2/2011 |
| JP | 2011-110687 A | 6/2011 |
| JP | 2011-115921 A | 6/2011 |
| JP | 2011-200943 A | 10/2011 |
| JP | 2012-035361 A | 2/2012 |
| JP | 2012-139807 A | 7/2012 |
| JP | 2013-084111 A | 5/2013 |
| JP | 2013-099806 A | 5/2013 |
| WO | WO-2004-052598 A1 | 6/2004 |
| WO | WO-2010-051248 A1 | 5/2010 |

OTHER PUBLICATIONS

Ohkuma, Shigeru, "Interuniversity Robot Seigyo", Chapter 3, "Various Sensors Adopted in Robot", Published in 1998, Published by: Ohmsha, Ltd., Japan, with English translation, (12 pages).

* cited by examiner

ROBOT, CONTROLLER, AND ROBOT SYSTEM

BACKGROUND

1. Technical Field

The present invention relates to a robot, a controller, and a robot system.

2. Related Art

For example, as industrial robots, horizontal articulated robots (SCARA robots), vertical articulated robots, etc. including robot arms have been used in related art. For control of the robots, information by sensors in the robot arms is used.

In the robots in related art, the number of sensors has been smaller and the sensors have been limited to angle sensors. On the other hand, in recent multifunctional robots, for example, impedance control, damping control using inertial sensors such as angular velocity sensors (gyro sensors) etc. are performed. Further, the number of sensors in the robot arm tends to increase with reduction in size, higher reliability, lower price of the sensors. Furthermore, the number of wires in the robot arm tends to increase by communication with the inertial sensors, end effectors (hand units), etc.

For wires connected to the sensors etc. in the robot arm, parallel wiring is used (for example, see Patent Document 1 (JP-A-2002-79487)). Further, a robot controller including an angle sensor and an angular velocity sensor as inertial sensors is disclosed (for example, see Patent Document 2 (JP-A-2005-242794)). In the robot that damps the robot arm using the inertial sensors, a vibration suppression effect largely varies depending on the locations and the number of the inertial sensors. Therefore, for suppression of the vibration of the robot arm, the locations and the number of the inertial sensors are important.

Further, the robots have been used in various fields such as industrial fields including assembly of industrial products. The robot includes a leg in contact with a surface such as a floor or ground on which the robot is installed, a torso supported by the leg, and an arm attached to the torso (for example, see Patent Document 3 (JP-A-2005-161414)). The torso is connected to the leg via a waist pivot and rotatable with respect to the leg in the circumferential direction of the waist pivot. The arm includes links etc. and movable with respect to the torso. The arm is driven and controlled by a control system electric device to execute predetermined processing. In Patent Document 3, the control system electric device is concentrated in the torso to avoid the leg etc. in order not to hinder motion performance of the leg etc.

However, in the case where the sensors etc. are connected via parallel wiring as in Patent Document 1, a problem of increase in the number of wires arises. The increase in the number of wires blocks downsizing of the robot. Particularly, in the robot that damps the robot arm using the inertial sensors as in Patent Document 2, the number of wires significantly increases. In addition, it is necessary to add terminals for connection of the inertial sensors to a substrate (a relay board and a calculation unit) to which the inertial sensors are connected, and addition in the number of inertial sensors is difficult.

Further, in the robot shown in Patent Document 3, the torso is heavier and larger as the number of parts provided in the torso is larger. For example, in a robot having a movable torso, if control system components and utility system components are collected in the torso, load on an actuator for moving the torso may increase due to increase of inertia moment of the torso.

SUMMARY

An advantage of some aspects of the invention is to solve at least a part of the problems described above, and the invention can be implemented as the following aspects or application examples.

A robot according to an aspect of the invention includes a robot arm, a drive unit that drives the robot arm, a first control unit that controls drive of the drive unit, a plurality of detection units at least one of which is an inertial sensor, and a wiring unit that series-connects the plurality of detection units and the first control unit.

According to this configuration, the plurality of detection units and the first control unit are series-connected (so-called daisy chain connection) by the wiring unit, and thereby, compared to the case where the respective detection units and the first control unit are parallel-connected (so-called star connection), the number of wires may be significantly reduced. Further, signals may be sequentially transmitted (so-called serial transmission) between the plurality of detection units and the first control unit, and thereby, increase of the detection units may be addressed without increase in the number of wires. Furthermore, the number of wires may be reduced by use of the inertial sensor as the detection unit and daisy chain connection of the inertial sensor, and generation of vibration when the robot arm is damped may be suppressed using the inertial sensor. In addition, when the inertial sensor is daisy-chain-connected, it is not necessary to newly provide a terminal for connection of the inertial sensor, and addition in the number of inertial sensors is easier.

In the configuration described above, the robot may further include an end effector provided on the robot arm and a second control unit that controls drive of the end effector, and the wiring unit may series-connect the plurality of detection units, the first control unit, and the second control unit.

In the case of this configuration, the plurality of detection units, the first control unit, and the second control unit are daisy-chain-connected by the wiring unit, and the number of wires may be significantly reduced.

In the configuration described above, at least one of the plurality of detection units may be a force detector.

In the case of this configuration, the force detector may be daisy-chain-connected by the wiring unit.

In the configuration described above, the robot may further include a monitoring and commanding unit that performs monitoring and commanding with respect to the second control unit and a communication control unit that sorts signals between the first control unit and the monitoring and commanding unit, and the wiring unit may series-connect the plurality of detection units, the first control unit, the second control unit, and the communication control unit.

In the case of this configuration, signals may be serial-transmitted between the plurality of detection units and the first control unit and signals may be serial-transmitted between the second control unit and the monitoring and commanding unit.

A robot according to an aspect of the invention includes a robot arm, a drive unit that drives the robot arm, a first control unit that controls drive of the drive unit, an end effector provided on the robot arm, and a second control unit that controls drive of the end effector, an inertial sensor provided in the robot arm, and a wiring unit that series-connects the first control unit, the second control unit, and the inertia sensor.

According to this configuration, the first control unit, the second control unit, and the inertial sensor are series-connected (so-called daisy chain connection) by the wiring unit, and thereby, compared to the case where they are parallel-connected (so-called star connection), the number of wires may be significantly reduced. Further, signals may be sequentially transmitted (so-called serial transmission) between the second control unit and the first control unit, and signals may be serial-transmitted between the inertial sensor and the first control unit. Furthermore, the number of wires may be reduced by daisy chain connection of the inertial sensor, and generation of vibration when the robot arm is damped may be suppressed using the inertial sensor. In addition, when the inertial sensor is daisy-chain-connected, it is not necessary to newly provide a terminal for connection of the inertial sensor, and addition in the number of inertial sensors is easier.

In the configuration described above, the robot may further include a force detector provided in the robot arm, and the wiring unit may series-connect the first control unit, the second control unit, the inertia sensor, and the force detector.

In the case of this configuration, the first control unit, the second control unit, the inertia sensor, and the force detector are daisy-chain-connected by the wiring unit, and the number of wires may be significantly reduced.

In the configuration described above, the robot may further include a plurality of the robot arms.

In the case of this configuration, the number of wires is reduced, and addition of an inertial sensor is easier with respect to each robot arm.

A robot according to an aspect of the invention includes a robot arm, a drive unit that drives the robot arm, a plurality of detection units at least one of which is an inertial sensor, a drive control unit that controls drive of the drive unit, a wiring unit that series-connects the plurality of detection units and the drive control unit, and an analog/digital conversion unit that converts a signal output from the inertial sensor from an analog value into a digital value. The inertial sensor and the analog/digital conversion unit are provided on the same substrate.

According to this configuration, the plurality of detection units and the drive control unit are series-connected (so-called daisy chain connection) by the wiring unit, and thereby, compared to the case where the respective detection units and the drive control unit are parallel-connected (so-called star connection), the number of wires may be significantly reduced. Further, the number of wires may be reduced by use of the inertial sensor as the detection unit and daisy chain connection of the inertial sensor, and generation of vibration when the robot arm is damped may be suppressed using the inertial sensor. Furthermore, the analog/digital conversion unit that converts the signal output from the inertial sensor from the analog value (analog signal) into the digital value (digital value) and the inertial sensor are provided on the same substrate, and accordingly, compared to the case where the inertial sensor is not provided on the substrate, the wires in which the analog signals are transmitted may be made shorter. Thereby, the effect of noise on the analog signals may be reduced and the space and the cost of the detection unit provided inside of the robot arm may be reduced.

In the configuration described above, the wiring unit may serial-transmit signals from the plurality of detection units and the drive control unit.

In the case of this configuration, signals detected by the plurality of detection units are serial-transmitted to the drive control unit, and thereby, increase of the detection units may be addressed without increase in the number of wires.

In the configuration described above, the number of nodes of the series-connected wiring unit may be set to be equal to or less than the number of joint units of the robot arm and the number of inertial sensors may be set to be equal to or less than the number of nodes.

Here, the number of nodes refers to the number of relay points and terminal points of series-connected wiring unit.

In the case of this configuration, the space and the cost of the above described detection unit provided inside of the robot arm may be reduced by reduction of the number of nodes.

In the configuration described above, a communication unit that transmits the signal converted in the analog/digital conversion unit to the drive control unit is further provided, and the communication unit may be provided on the substrate.

In the case of this configuration, the space and the cost of the above described detection unit provided inside of the robot arm may be further reduced.

In the configuration described above, at least one of the plurality of detection units may be a force detector.

In the case of this configuration, the force detector may be daisy-chain-connected by the wiring unit.

In the configuration described above, the robot may further include a plurality of the robot arms.

In the case of this configuration, the number of wires is reduced with respect to each robot arm.

A controller according to an aspect of the invention controls the robot according to the aspect of the invention.

A robot system according to an aspect of the invention includes the robot according to the aspect of the invention.

A robot according to a first aspect of the invention includes a base, a torso rotatably provided on the base, an arm provided on the torso and being movable with respect to the torso, an actuator that moves the arm, and a drive device provided in the base and driving the actuator.

In the robot of this configuration, the drive device that drives the actuator is provided in the base, and thereby, compared to the configuration in which the drive device is provided in the torso, inertia moment of the torso may be reduced. Accordingly, the robot may reduce load on the actuator that moves the torso.

In the robot of the first aspect, the drive device may be housed inside of the base.

The robot may be space-saving and the interference and the collision of the drive device with the outside of the base may be avoided.

In the robot of the first aspect, a center of gravity of the drive device may be placed below a center of gravity of a robot main body including the torso, the arm, and the base in a direction of gravitational force.

The center of gravity is lower and the robot may be stably installed.

The robot of the first aspect may include a calculation device housed inside of the base and calculating position information of the arm.

In the robot, the calculation device is provided in the base, and thereby, compared to the configuration in which the calculation device is provided in the torso, inertia moment of the torso may be reduced and the degree of freedom of design of the torso may be improved. Further, the calculation device is housed inside of the base, and thereby, the robot may be space-saving and the interference and the collision of the calculation device with the outside of the base may be reduced.

The robot of the first aspect may include a first detector provided in the arm and detecting position information of the arm, and the calculation device may calculate the position information of the arm using a result detected by the first detector.

The robot may control the position of the arm with higher accuracy.

The robot of the first aspect may include a second detector provided in the torso and detecting position information of the torso, and the calculation device may calculate the position information of the arm using a result detected by the second detector.

The robot may control the position of the torso with higher accuracy and control the position of the arm attached to the torso with higher accuracy.

A robot according to a second aspect of the invention includes a base, a torso provided on the base via a waste pivot and rotatably attached with respect to the base in a circumferential direction of the waste pivot, a plurality of arms provided on the torso and being movable with respect to the torso, an actuator that moves the plurality of arms, first detectors provided in the respective plurality of arms and detecting position information of the arms, a second detector provided in the torso and detecting position information of the torso, a drive device housed in the base and driving the actuator, and a calculation device housed in the base and calculating respective position information of the plurality of arms using results detected by the first detector and a result detected by the second detector.

In the robot, the drive device that drives the actuator is provided in the base, and thereby, compared to the configuration in which the drive device is provided in the torso, inertia moment of the torso may be reduced. Accordingly, the robot may reduce load on the actuator that moves the torso.

A controller according to a third aspect of the invention controls the robot of the first aspect or the second aspect. The robot of the first aspect or the second aspect may reduce inertia moment of the torso, and thereby, the controller may control the position of the torso with higher accuracy and control the position of the arm attached to the torso with higher accuracy.

A robot system according to a fourth aspect of the invention includes the robot of the first aspect or the second aspect and a controller that controls the robot. The robot of the first aspect or the second aspect may reduce inertia moment of the torso, and thereby, the robot system may control the position of the torso with higher accuracy and control the position of the arm attached to the torso with higher accuracy.

A robot according to a fifth aspect of the invention includes a base, a movable unit rotatably provided on the base, a drive device that drives the movable unit, an angular velocity detection device that detects motion of the movable unit, and a calculation device that calculates information of a position of the movable unit using a detection result of the angular velocity detection device, and at least one of the drive unit and the calculation unit is provided in the movable unit.

The robot of the fifth aspect calculates the position of the movable unit using the detection result of the angular velocity detection device, and thereby, the position of the movable unit may be controlled so that swing of the movable unit may be reduced or cancelled. As a result, the position of the movable unit may be controlled with higher accuracy.

In the robot of the fifth aspect, the angular velocity detection device may be provided in the movable unit.

The robot may detect motion of the movable unit using the angular velocity detection device with higher accuracy.

In the robot of the fifth aspect, the movable unit may include a torso provided on the base via a waste pivot and being rotatable in a circumferential direction of the waste pivot, and an arm provided on the torso and being movable with respect to the torso, and the drive device may be provided in the torso.

In the robot of the fifth aspect, the calculation device may be provided in the torso.

In the robot, compared to the configuration in which the calculation device is provided in the base, the calculation device may be easier to be connected to the drive device using a cable or the like, and, for example, twist of the cable due to rotation of the movable unit may be avoided.

In the robot of the fifth aspect, the angular velocity detection device may include a first angular velocity detector provided in the torso and detecting motion of the torso.

The robot may control the position of the torso so that swing of the torso may be reduced or cancelled using a detection result of the first angular velocity detector. As a result, the position of the torso may be controlled with higher accuracy and the position of the arm provided on the torso may be controlled with higher accuracy.

In the robot of the fifth aspect, the angular velocity detection device may include a second angular velocity detector provided in the arm and detecting motion of the arm. The robot may control the position of the arm so that swing of the arm may be reduced or cancelled using a detection result of the second angular velocity detector. As a result, the position of the arm may be controlled with higher accuracy.

In the robot of the fifth aspect, the drive device may be provided in the movable unit and the calculation device may be provided in the base. Also, in the robot, the position of the movable unit may be controlled so that swing of the movable unit may be reduced or cancelled.

In the robot of the fifth aspect, the movable unit may include a torso provided on the base via a waste pivot and being rotatable in a circumferential direction of the waste pivot, and an arm provided on the torso and being movable with respect to the torso, and the angular velocity detection device may include one of a first angular velocity detector provided in the torso and detecting motion of the torso and a second angular velocity detector provided in the arm and detecting motion of the arm.

The robot calculates the information of the position of the movable unit using a detection result of at least one of the first angular velocity detector and the second angular velocity detector, and thereby, the position of the movable unit may be controlled with higher accuracy.

The robot of the fifth aspect may include a rolling member that enables the base to roll on a surface on which the base is provided.

The robot is movable by the rolling member, and, for example, the installation position may be easily changed and the convenience is improved.

A controller according to a seventh aspect of the invention controls the robot of the first aspect. The robot of the first aspect calculates the information of the position of the movable unit using a detection result of the angular velocity detection device, and thereby, the controller of the second aspect may control the position of the movable unit so that swing of the movable unit may be reduced or cancelled.

A robot system according to a eighth aspect of the invention includes the robot of the first aspect and a controller that controls the robot. The robot of the first aspect calculates the information of the position of the movable unit using a detection result of the angular velocity detection device, and thereby, the controller may control the position of the movable unit so that swing of the movable unit may be reduced or cancelled. As a result, the robot system of the third aspect may control the position of the movable unit with higher accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
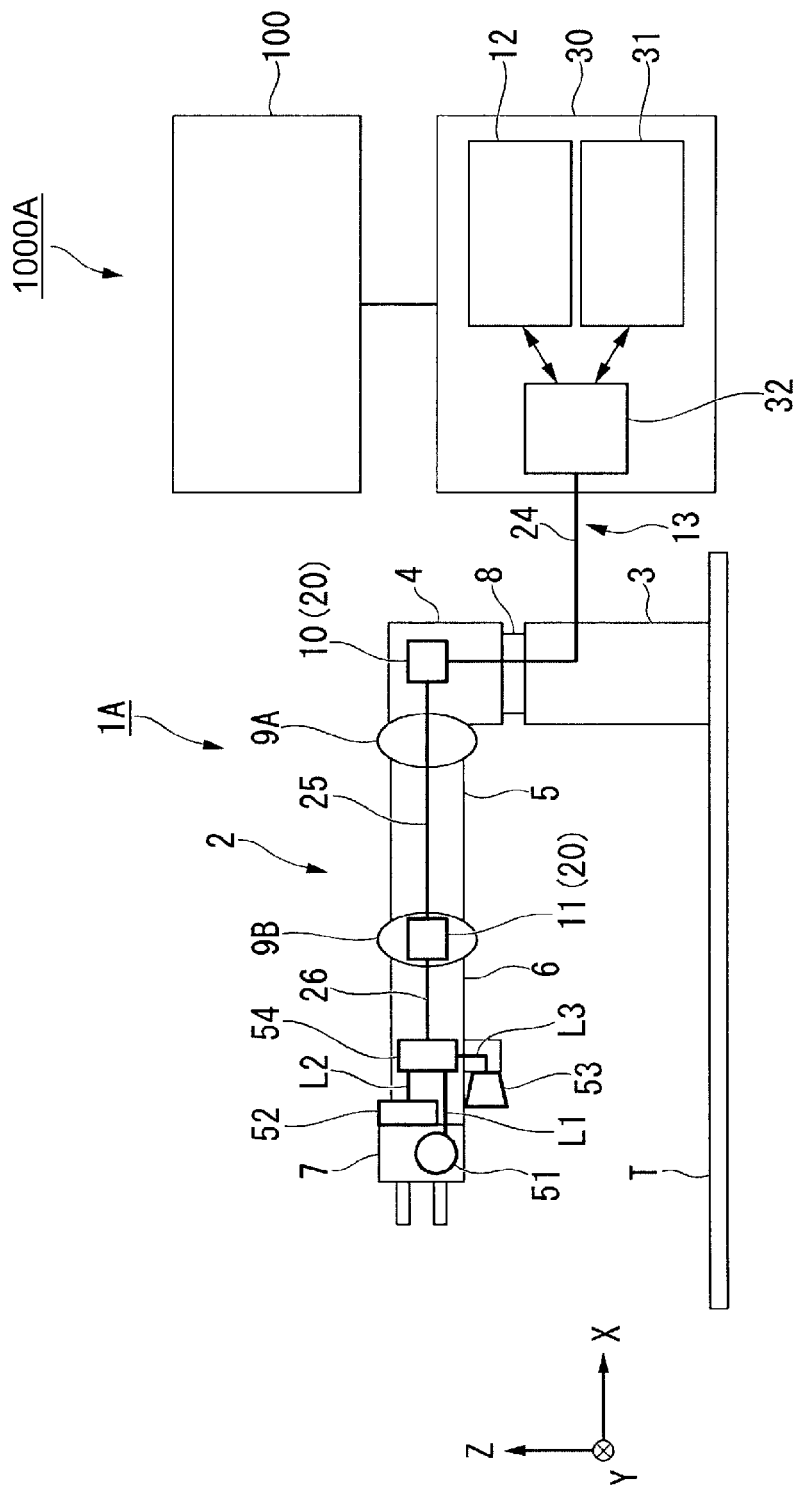
FIG. 1 is a side view showing a schematic configuration of a robot according to a first embodiment of the invention.

As below, embodiments of the invention will be explained in detail with reference to the drawings.

Note that the invention is not limited to the following embodiments, but may be embodied with appropriate changes without departing from the scope thereof. Further, in the drawings used in the following explanation, the component elements may be schematically shown for clear view of the respective component elements, and scales of the dimensions may be differentiated depending on the component elements.

First Embodiment

Robot

First, a robot 1A of the first embodiment will be explained with reference to FIG. 1.

FIG. 1 is a side view showing a schematic configuration of the robot 1A.

Further, in the following explanation, an XYZ orthogonal coordinate system is set and the positional relations among the respective members will be explained with reference to the XYZ orthogonal coordinate system. Specifically, lateral directions of the paper surface in FIG. 1 are referred to as X-axis directions, directions orthogonal to the paper surface in FIG. 1 are referred to as Y-axis directions, and vertical directions orthogonal to the paper surface in FIG. 1 are referred to as Z-axis directions. Further, directions around the X-axis, the Y-axis, and the Z-axis are referred to as a θX-direction, a θY-direction, and a θZ-direction, respectively.

The robot 1A is the so-called horizontal articulated robot (SCARA robot) including a robot arm 2 as shown in FIG. 1. The robot arm 2 has a base 3, a torso unit 4, a first arm unit 5, a second arm unit 6, and a hand unit 7.

The base 3 is installed on an installation surface T. The torso unit 4 is coupled onto the base 3 via a first joint unit 8. Inside of the first joint unit 8, a rotation drive mechanism (first drive unit) that rotationally drives the torso unit 4 in the θZ-direction with respect to the base 3 is provided (not shown in FIG. 1). The first arm unit 5 is coupled to the side surface of the torso unit 4 via a second joint unit 9A. Inside of the second joint unit 9A, a rotation drive mechanism (second drive unit) that rotationally drives the first arm unit 5 in the θY-direction with respect to the torso unit 4 is provided (not shown in FIG. 1). The second arm unit 6 is coupled to the distal end of the first arm unit 5 via a third joint unit 9B. Inside of the third joint unit 9B, a rotation drive mechanism (third drive unit) that rotationally drives the second arm unit 6 in the θY-direction with respect to the first arm unit 5 is provided (not shown in FIG. 1). The hand unit 7 is coupled to the distal end of the second arm unit 6.

End effectors according to various operations are replaceably attached to the hand unit 7. In the embodiment, an actuator 51, an illumination device 52, and an imaging device 53 are provided as the end effectors and connected to a sub-controller (second control unit) 54 via wires L1 to L3, respectively.

The actuator 51 includes a motor for driving the hand unit 7. The illumination device 52 includes an LED for applying illumination light at operation of the hand unit 7. The imaging device 53 includes a camera for imaging at operation of the hand unit 7. The sub-controller 54 controls respective drive of the actuator 51, the illumination device 52, and the imaging device 53 forming the end effectors.

The robot 1A includes a first detection unit 10, a second detection unit 11, a drive control unit (first control unit) 12, and a wiring unit 13 in addition to the above described robot arm 2.

The first detection unit 10 is provided inside of the torso unit 4 and detects a drive state (angle, position, etc.) of the torso unit 4 with respect to the base 3. The second detection unit 11 is provided inside of the third joint unit 9B and detects drive states (angles, positions, etc.) of the first arm unit 5 and the second arm unit 6 with respect to the torso unit 4.

As the first detection unit 10 and the second detection unit 11, for example, an angle sensor, an angular velocity sensor (gyro sensor), a force sensor, etc. may be used. Of them, the angle sensor has one direction of the θX-direction, the θY-direction, the θZ-direction as the detection direction. The angular velocity sensor has three directions of the θX-direction, the θY-direction, the θZ-direction as the detection directions. The force sensor has six directions of the X-direction, the Y-direction, the Z-direction, the θX-direction, the θY-direction, the θZ-direction as the detection directions.

In the embodiment, for damping control of the robot arm 2, angular velocity sensors 20 are used for the first detection unit 10 and the second detection unit 11. Note that, for damping control of the robot arm 2, not only the angular velocity sensors 20 but also inertial sensors such as acceleration sensors may be used.

Figure 2:
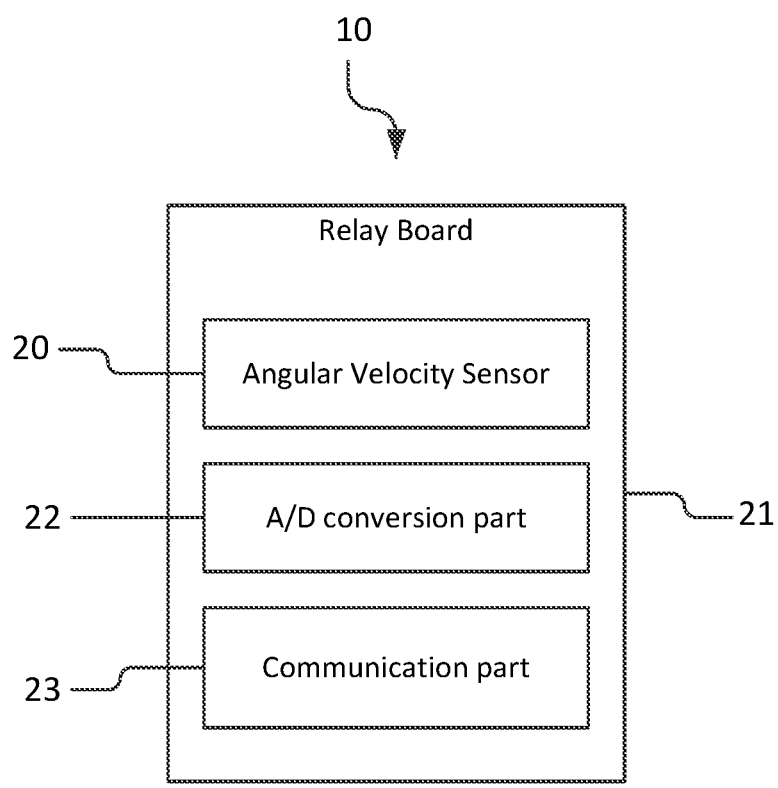
FIG. 2 is a block diagram showing an example of a detection unit of the robot shown in FIG. 1.

As shown in FIG. 2, the angular velocity sensor 20 forming the first detection unit 10 is provided on a relay board (substrate) 21. On the relay board 21, not only the angular velocity sensor 20 but also an analog/digital conversion part (A/D conversion part) 22 and a communication part 23 are provided. The A/D conversion part 22 A/D-converts a detection signal output from the angular velocity sensor 20 from an analog value (analog signal) into a digital value (digital signal). The communication part 23 converts the A/D-converted signal into a signal suitable for communication (serial signal) and transmits the signal to the drive control unit 12.

As shown in FIG. 1, the drive control unit 12 is a servo calculation unit that performs calculation for controlling drive of the above described first drive unit, the second drive unit, and the third drive unit based on the detection signals detected by the first detection unit 10 and the second detection unit 11. The drive control unit 12 forms part of a robot controller (subordinate controller) 30 that controls the motion of the robot arm 2.

The robot controller 30 has a monitoring and commanding unit 31 and a communication control unit 32 in addition to the drive control unit 12. The monitoring and commanding unit 31 performs monitoring and commanding with respect to the sub-controller 54. The communication control unit 32 sorts signals between the drive control unit 12 and the monitoring and commanding unit 31.

Further, a system controller (superior controller) 100 is connected to the robot controller 30. The system controller 100 performs integrated control of the robot 1A and the system controller 100 and the robot 1A form a robot system 1000A. In the robot system 1000A, monitoring and commanding of the robot 1A by an operator may be performed via the system controller 100.

The robot controller 30 performs servo control of drive quantities of the above described first drive unit, the second drive unit, and the third drive unit based on results obtained by calculation by the drive control unit 12 in order to allow the robot arm 2 to automatically perform predetermined motion based on the command from the system controller 100 or the like.

The wiring unit 13 has a first signal line 24, a second signal line 25, and a third signal line 26. The first signal line 24 connects between the first detection unit 10 and the communication control unit 32. The second signal line 25 connects between the first detection unit 10 and the second detection unit 11. The third signal line 26 connects between the second detection unit 11 and the sub-controller 54. Thereby, the first detection unit 10, the second detection unit 11, the sub-controller 54, and the communication control unit 32 are series-connected (daisy-chain-connected) via the first signal line 24, the second signal line 25, and the third signal line 26.

The detection signals detected by the first detection unit 10 and the second detection unit 11 are sequentially transmitted (serial-transmitted) to the communication control unit 32 via the daisy-chain-connected wiring unit 13. The detection signals are sorted in the communication control unit 32 and input to the drive control unit 12. On the other hand, the signals communicated between the sub-controller 54 and the monitoring and commanding unit are sorted in the communication control unit 32 and serial-transmitted via the daisy-chain-connected wiring unit 13.

In the robot 1A having the above described configuration, the torso unit 4 is rotationally driven in the θZ-direction with respect to the base 3, the first arm unit 5 is rotationally driven in the θX-direction (θY-direction) with respect to the torso unit 4, the second arm unit 6 is rotationally driven in the θX-direction (θY-direction) with respect to the first arm unit 5, and thereby, various kinds of operation may be performed by operation of moving the hand unit 7 to arbitrary positions.

Now, in the robot 1A of the embodiment, the angular velocity in the θZ-direction is detected by the first detection unit 10 at driving of the torso unit 4, and the detection signal is serial-transmitted to the communication control unit 32 via the daisy-chain-connected wiring unit 13 (first signal line 24). Further, in the robot 1A of the embodiment, the angular velocities in the θX-direction, the θY-direction, and the θZ-direction are respectively detected by the second detection unit 11 at driving of the first arm unit 5 and the second arm unit 6, and the respective detection signals are serial-transmitted to the communication control unit 32 via the daisy-chain-connected wiring unit 13 (first signal line 24 and second signal line 25). Furthermore, at the operation of the hand unit 7, communication is made between the sub-controller 54 and the monitoring and commanding unit 31, and the communicated signals are serial-transmitted to the communication control unit 32 via the daisy-chain-connected wiring unit 13 (first signal line 24, second signal line 25, and third signal line 26).

As described above, in the robot 1A of the embodiment, the above described first detection unit 10, second detection unit 11, sub-controller 54, and communication control unit 32 (robot controller 30) are daisy-chain-connected via the first signal line 24, the second signal line 25, and the third signal line 26. Accordingly, compared to the case where they are parallel-connected (so-called star connection), the number of signal lines (number of wires) may be significantly reduced.

Further, in the robot 1A of the embodiment, the angular velocity sensors 20 are used as the detection units (the first detection unit 10 and the second detection unit 11 in the embodiment), and the number of wires may be reduced by daisy chain connection of the angular velocity sensors 20, and generation of vibration when the robot arm 2 is damped may be suppressed using the angular velocity sensors 20. Furthermore, when the angular velocity sensors 20 are daisy-chain-connected, it is not necessary to newly provide terminals for connection of the angular velocity sensors 20, and addition of the number of angular velocity sensors 20 is easier. For example, in the case where the angular velocity sensor (not shown) is added and used inside of the second joint unit 9A, the angular velocity sensor may be series-connected (daisy-chain-connected) to the second signal line 25.

Further, in the robot 1A of the embodiment, the detection signals detected by the first detection unit 10 and the second detection unit 11 are serial-transmitted to the drive control unit 12, and thereby, increase of the detection units may be addressed without increase in the number of wires.

Furthermore, in the robot 1A of the embodiment, the angular velocity sensor 20 and the A/D conversion part 22 forming the above described first detection unit 10 are provided on the same relay board 21. In the case of the configuration, the angular velocity sensor 20 and the relay board 21 are modularized, and the wires in which the analog signals are transmitted may be made shorter than in the case where the angular velocity sensor 20 is not provided on the relay board 21. Thereby, the effect of noise on the analog signals may be reduced and the space and the cost of the first detection unit 10 provided inside of the robot arm 2 may be reduced. Further, the communication part 23 is provided on the relay board 21, that is, the angular velocity sensor 20, the communication part 23, and the relay board 21 are modularized, and thereby, the space and the cost of the first detection unit 10 provided inside of the robot arm 2 may be further reduced.

In the robot 1A of the embodiment, it is preferable that the number of nodes of the series-connected (daisy-chain-connected) wiring unit 13 is set to be equal to or less than the number of joint units of the robot arm 2 and the number of angular velocity sensors 20 (inertial sensors) is set to be equal to or less than the number of nodes.

Here, the number of nodes refers to the number of relay points and terminal points of series-connected signal lines. In the embodiment, the number of nodes of the wiring unit 13 (the first signal line 24 and the second signal line 25) is two, the number of joint units (the first joint unit 8 and the second joint unit 9) of the robot arm 2 is two, and the number of angular velocity sensors 20 is two. Therefore, the above described condition is satisfied.

In the robot 1A of the embodiment, in the first detection unit 10, the angular velocity sensor 20 is provided on the relay board 21, and thereby, the above described condition is naturally satisfied. That is, in the case where the detection unit using the angular velocity sensor 20 is provided in the joint unit of the robot arm 2, the configuration in which the angular velocity sensor 20 modularized with the relay board 21 is provided may minimize the number of relay boards (nodes) as relay points of the signal lines. Therefore, in the case of the configuration, the space and the cost of the first detection unit 10 provided inside of the robot arm 2 may be reduced by reduction of the number of relay boards 21 (nodes).

Second Embodiment

Robot

Next, a robot 1B of the second embodiment will be explained with reference to FIG. 3.

Figure 3:
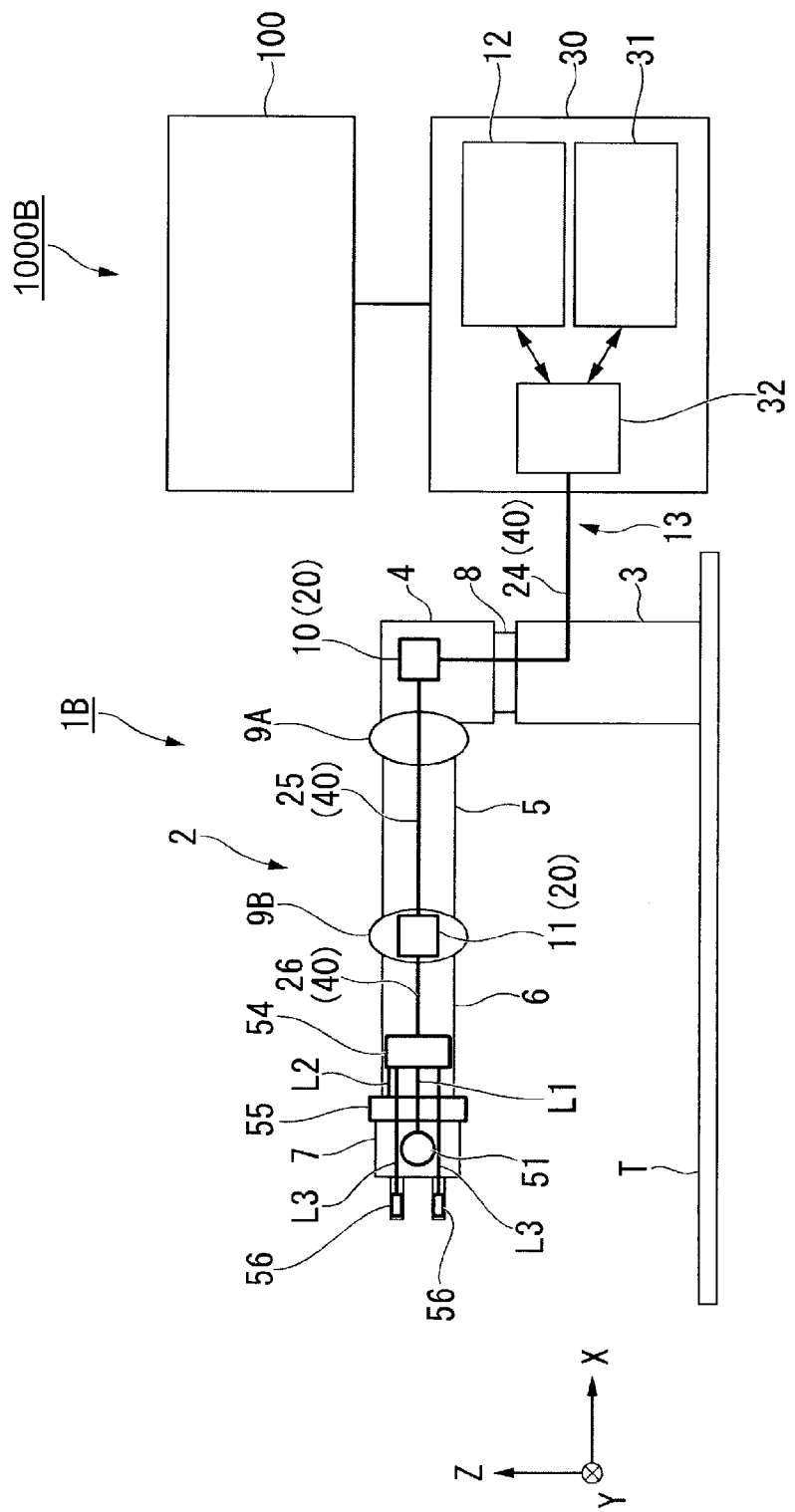
FIG. 3 is a side view showing a schematic configuration of a robot according to a second embodiment of the invention.

FIG. 3 is a side view showing a schematic configuration of the robot 1B.

In the following explanation, the explanation of the parts equal to those of the robot 1A will be omitted and the same signs will be attached to the parts in the drawings.

As shown in FIG. 3, the robot 1B has a configuration in which a serial signal line 40 is used for the above described first signal line 24, second signal line 25, and third signal line 26. Further, in the hand unit 7, a force sensor (force detector) 55 and tactile sensors (detection unit) 56 are provided as end effectors in place of the illumination device and the imaging device 53, and connected to the sub-controller 54 via the respective wires L1 to L3. The rest of the configuration is basically the same as that of the above described robot 1A.

In the case of using the serial signal line 40, the detection signals detected by the first detection unit 10, the second detection unit 11, the force sensor 55, and the tactile sensors 56 may be serial-transmitted to the communication control unit 32 via the single serial signal line 40. Therefore, in the robot 1B of the embodiment, even when the number of sensors (detection units) increases, the number of signal lines (wires) may be significantly reduced like the above described robot 1A.

A robot system 1000B of the embodiment includes the robot 1B, the robot controller 30, and the system controller 100.

Third Embodiment

Robot

Next, a robot 1C of the third embodiment will be explained with reference to FIG. 4.

Figure 4:
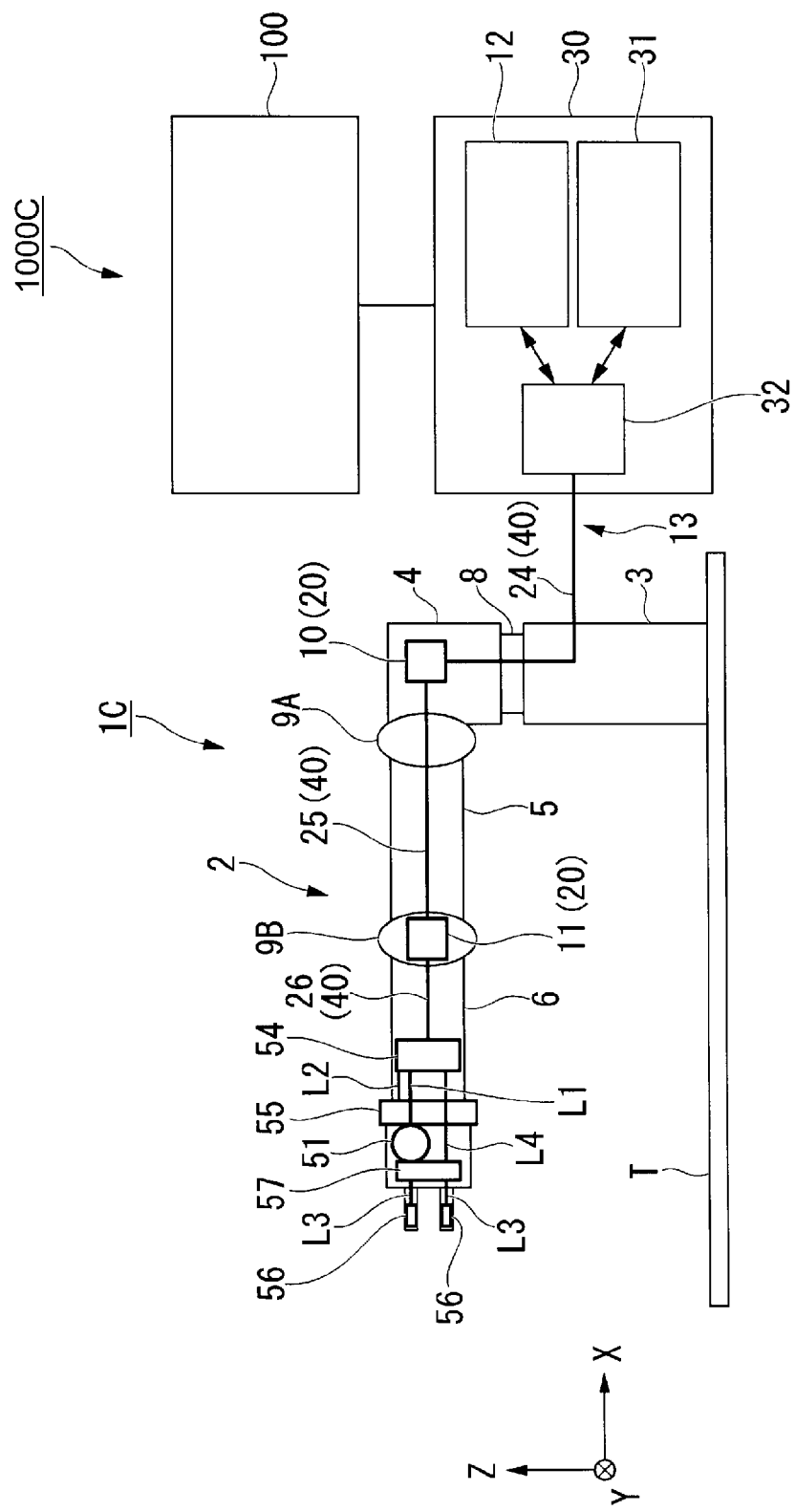
FIG. 4 is a side view showing a schematic configuration of a robot according to a third embodiment of the invention.

FIG. 4 is a side view showing a schematic configuration of the robot 1C.

In the following explanation, the explanation of the parts equal to those of the robot 1A will be omitted and the same signs will be attached to the parts in the drawings.

As shown in FIG. 4, the robot 1C has a configuration in which another sub-controller (second control unit) 57 is added to the configuration of the robot 1B shown in FIG. 3. The sub-controller 57 is connected to the tactile sensors 56 via the wires L3, and connected to the sub-controller 54 via a wire L4. The rest of the configuration is basically the same as those of the above described robots 1A, 1B.

In the robot 1C of the embodiment, even when the numbers of sensors (detection units) and sub-controllers (second control units) increase, the number of signal lines (wires) may be significantly reduced by daisy chain connection using the wiring unit 13 like the above described robots 1A, 1B.

A robot system 1000C of the embodiment includes the robot 1C, the robot controller 30, and the system controller 100.

Fourth Embodiment

Robot

Next, a robot 1D of the fourth embodiment will be explained with reference to FIG. 5.

Figure 5:
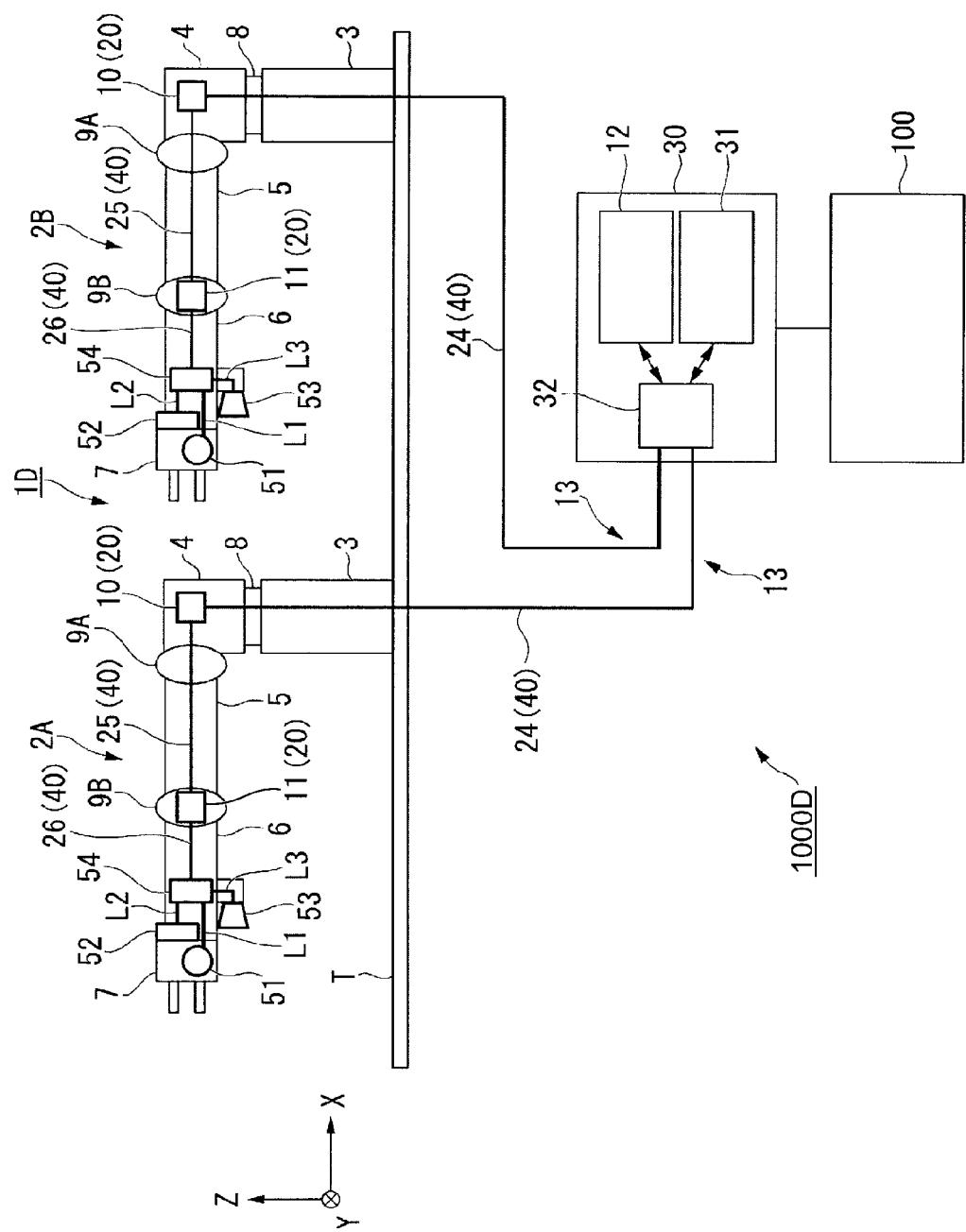
FIG. 5 is a side view showing a schematic configuration of a robot according to a fourth embodiment of the invention.

FIG. 5 is a side view showing a schematic configuration of the robot 1D.

In the following explanation, the explanation of the parts equal to those of the robot 1A will be omitted and the same signs will be attached to the parts in the drawings.

As shown in FIG. 5, the robot 1D has a configuration in which a plurality of (two) robot arms 2A, 2B are provided. The robot arms 2A, 2B have the same configuration as the robot arm 2 shown in FIG. 1. The robot arms are connected to the communication control unit 32 (robot controller 30) via the respective first signal lines 24.

The rest of the configuration is basically the same as that of the above described robot 1A. In the robot 1D of the embodiment, even when the plurality of robot arms 2A, 2B are provided, the number of wires may be significantly reduced like the above described robot 1A.

A robot system 1000D of the embodiment includes the robot 1D, the robot controller 30, and the system controller 100.

Note that the invention is not necessarily limited to the above described embodiments, but various changes may be made without departing from the scope of the invention.

For example, the configuration of the robot arm 2 is not particularly limited, and the number, the type, etc. of the detection units may be changed according to the number, the type, etc. of the arm units, joint units, hand units, and the drive units. In this case, as in the cases of the embodiments, the same advantages as those of the embodiments may be obtained by daisy chain connection of a plurality of detection units at least one of which is an inertial sensor and a drive control unit (first control unit) that controls drive of the drive unit via the wiring unit.

Further, not only in the configuration in which the plurality of detection units are provided but also in a configuration in which only one inertial sensor is provided in the robot arm 2, the same advantages as those of the embodiments may be obtained by daisy chain connection of the inertial sensor, a drive control unit (first control unit) that controls drive of the drive unit and a sub-controller (second control unit) that controls drive of the end effectors via the wiring unit.

Fifth Embodiment

Robot

Next, a robot 1E of the fifth embodiment will be explained with reference to FIG. 6.

Figure 6:
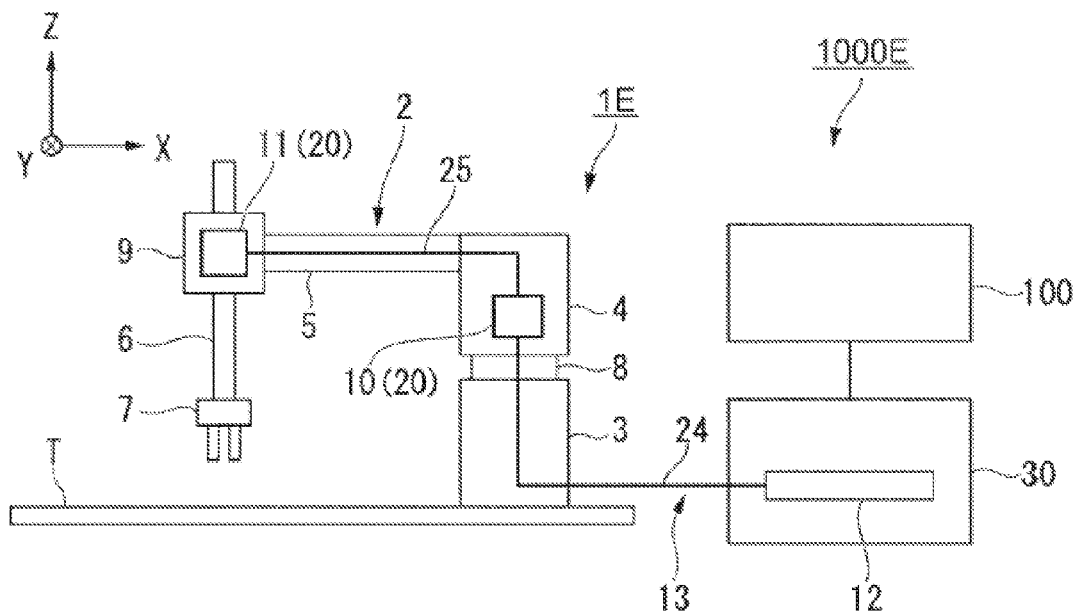
FIG. 6 is a side view showing a schematic configuration of a robot according to a fifth embodiment of the invention.

FIG. 6 is a side view showing a schematic configuration of the robot 1E. In the following explanation, the explanation of the parts equal to those of the robot 1A will be omitted and the same signs will be attached to the parts in the drawings.

As shown in FIG. 6, the robot 1E of the embodiment is the so-called horizontal articulated robot (SCARA robot) including a robot arm 2. The robot arm 2 has a base 3, a torso unit 4, a first arm unit 5, a second arm unit 6, and a hand unit 7.

The base 3 is installed on an installation surface T. The torso unit 4 is coupled onto the base 3 via a first joint unit 8. Inside of the first joint unit 8, a rotation drive mechanism (first drive unit) that rotationally drives the torso unit 4 in the θZ-direction with respect to the base 3 is provided (not shown in FIG. 6). The first arm unit 5 is coupled to the side surface of the torso unit 4. The second arm unit 6 is coupled to the distal end of the first arm unit 5 via a second joint unit 9. Inside of the second joint unit 9, a rotation drive mechanism (second drive unit) that rotationally drives the second arm unit 6 in the θZ-direction with respect to the first arm unit 5 and a linear drive mechanism (third drive unit) that reciprocatively drives the arm unit in the Z-axis direction are provided (not shown in FIG. 6). The hand unit 7 is coupled to the distal end of the second arm unit 6. For example, end effectors including an actuator, an illumination, a camera, a sensor, and a control unit according to various operations are replaceably attached to the hand unit 7.

The robot 1E includes a first detection unit 10, a second detection unit 11, a drive control unit 12, and a wiring unit 13 in addition to the above described robot arm 2.

The first detection unit 10 is provided inside of the torso unit 4 and detects a drive state (angle, position, etc.) of the torso unit 4 with respect to the base 3. The second detection unit 11 is provided inside of the second joint unit 9 and detects a drive state (angle, position, etc.) of the second arm unit 6 with respect to the first arm unit 5.

As the first detection unit 10 and the second detection unit 11, for example, an angle sensor, an angular velocity sensor (gyro sensor), a force sensor, etc. may be used. Of them, the angle sensor has one direction of the θX-direction, the θY-direction, the θZ-direction as the detection direction. The angular velocity sensor has three directions of the θX-direction, the θY-direction, the θZ-direction as the detection directions. The force sensor has six directions of the X-direction, the Y-direction, the Z-direction, the θX-direction, the θY-direction, the θZ-direction as the detection directions.

In the embodiment, for damping control of the robot arm 2, angular velocity sensors 20 are used for the first detection unit 10 and the second detection unit 11. Note that, for damping control of the robot arm 2, not only the angular velocity sensors 20 but also inertial sensors such as acceleration sensors may be used.

Figure 7:
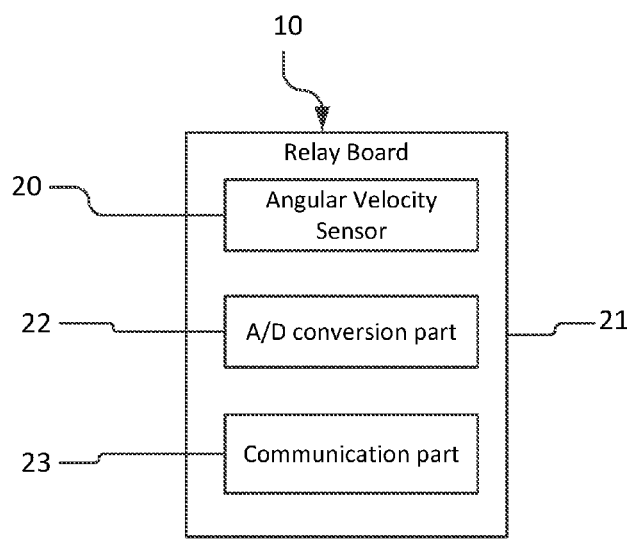
FIG. 7 is a block diagram showing an example of a detection unit of the robot shown in FIG. 6.

As shown in FIG. 7, the angular velocity sensor 20 forming the first detection unit 10 is provided on a relay board (substrate) 21. On the relay board 21, not only the angular velocity sensor 20 but also an analog/digital conversion part (A/D conversion part) 22 and a communication part 23 are provided. The A/D conversion part 22 A/D-converts a detection signal output from the angular velocity sensor 20 from an analog value (analog signal) into a digital value (digital signal). The communication part 23 converts the A/D-converted signal into a signal suitable for communication (serial signal) and transmits the signal to the drive control unit 12.

As shown in FIG. 6, the drive control unit 12 is a servo calculation unit that performs calculation for controlling drive of the above described first drive unit, the second drive unit, and the third drive unit based on the detection signals detected by the first detection unit 10 and the second detection unit 11. The drive control unit 12 forms part of a robot controller (subordinate controller) 30 that controls the motion of the robot arm 2.

Further, a system controller (superior controller) 100 is connected to the robot controller 30. The system controller 100 performs integrated control of the robot 1E and the system controller 100 and the robot 1E form a robot system 1000E. In the robot system 1000E, monitoring and commanding of the robot 1E by an operator may be performed via the system controller 100.

The robot controller 30 performs servo control of drive quantities of the above described first drive unit, the second drive unit, and the third drive unit based on results obtained by calculation by the drive control unit 12 in order to allow the robot arm 2 to automatically perform predetermined motion based on the command from the system controller 100 or the like.

The wiring unit 13 has a first signal line 24 and a second signal line 25. The first signal line 24 connects between the first detection unit 10 and the drive control unit 12. The second signal line 25 connects between the first detection unit 10 and the second detection unit 11. Thereby, the first detection unit 10, the second detection unit 11, and the drive control unit 12 are series-connected (daisy-chain-connected) via the first signal line 24 and the second signal line 25. The detection signals detected by the first detection unit 10 and the second detection unit 11 are sequentially transmitted (serial-transmitted) to the drive control unit 12 via the wiring unit 13.

In the robot 1E having the above described configuration, the torso unit 4 is rotationally driven in the θZ-direction with respect to the base 3 so that the first arm unit 5 may be rotatable around the base 3. Further, the second arm unit 6 is rotationally driven in the θZ-direction with respect to the first arm unit 5 and the second arm unit 6 is reciprocatively driven in the Z-axis direction with respect to the first arm unit 5, and thereby, various kinds of operation may be performed by operation of moving the hand unit 7 to arbitrary positions.

Now, in the robot 1E of the embodiment, the angular velocity in the θZ-direction is detected by the first detection unit 10 at driving of the torso unit 4, and the detection signal is serial-transmitted to the drive control unit 12 via the daisy-chain-connected wiring unit 13 (first signal line 24).

Further, in the robot 1E of the embodiment, the angular velocities in the θX-direction, the θY-direction, and the θZ-direction are respectively detected by the second detection unit 11 at driving of the second arm unit 6, and the respective detection signals are serial-transmitted to the drive control unit 12 via the daisy-chain-connected wiring unit 13 (first signal line 24 and second signal line 25).

As described above, in the robot 1E of the embodiment, the above described first detection unit 10, second detection unit 11, and drive control unit 12 are daisy-chain-connected via the first signal line 24 and the second signal line 25. Accordingly, compared to the case where the respective detection units and the drive control unit are parallel-connected (so-called star connection), the number of signal lines (number of wires) may be significantly reduced. Further, the angular velocity sensors 20 are used as the detection units (the first detection unit 10 and the second detection unit 11 in the embodiment), and the number of wires may be reduced by daisy chain connection of the angular velocity sensors 20, and generation of vibration when the robot arm 2 is damped may be suppressed using the angular velocity sensors 20.

Further, in the robot 1E of the embodiment, the detection signals detected by the first detection unit 10 and the second detection unit 11 are serial-transmitted to the drive control unit 12, and thereby, increase of the detection units may be addressed without increase in the number of wires.

Furthermore, in the robot 1E of the embodiment, the angular velocity sensor 20 and the A/D conversion part 22 forming the above described first detection unit 10 are provided on the same relay board 21. In the case of the configuration, the angular velocity sensor 20 and the relay board 21 are modularized, and the wires in which the analog signals are transmitted may be made shorter than in the case where the angular velocity sensor 20 is not provided on the relay board 21. Thereby, the effect of noise on the analog signals may be reduced and the space and the cost of the first detection unit 10 provided inside of the robot arm 2 may be reduced. Further, the communication part 23 is provided on the relay board 21, that is, the angular velocity sensor 20, the communication part 23, and the relay board 21 are modularized, and thereby, the space and the cost of the first detection unit 10 provided inside of the robot arm 2 may be further reduced.

In the robot 1E of the embodiment, it is preferable that the number of nodes of the series-connected (daisy-chain-connected) wiring unit 13 is set to be equal to or less than the number of joint units of the robot arm 2 and the number of angular velocity sensors 20 (inertial sensors) is set to be equal to or less than the number of nodes.

Here, the number of nodes refers to the number of relay points and terminal points of series-connected signal lines. In the embodiment, the number of nodes of the wiring unit 13 (the first signal line 24 and the second signal line 25) is two, the number of joint units (the first joint unit 8 and the second joint unit 9) of the robot arm 2 is two, and the number of angular velocity sensors 20 is two. Therefore, the above described condition is satisfied.

In the robot 1E of the embodiment, in the first detection unit 10, the angular velocity sensor 20 is provided on the relay board 21, and thereby, the above described condition is naturally satisfied. That is, in the case where the detection unit using the angular velocity sensor 20 is provided in the joint unit of the robot arm 2, the configuration in which the angular velocity sensor 20 modularized with the relay board 21 is provided may minimize the number of relay boards (nodes) as relay points of the signal lines. Therefore, in the case of the configuration, the space and the cost of the first detection unit 10 provided inside of the robot arm 2 may be reduced by reduction of the number of relay boards 21 (nodes).

Sixth Embodiment

Robot

Next, a robot 1F of the sixth embodiment will be explained with reference to FIG. 8.

Figure 8:
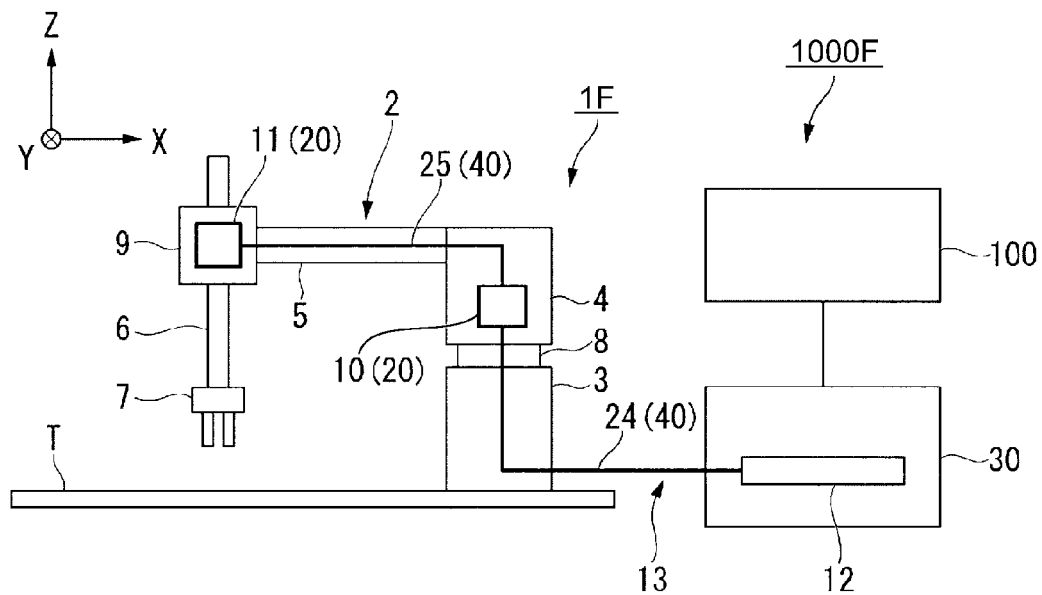
FIG. 8 is a side view showing a schematic configuration of a robot according to a sixth embodiment of the invention.

FIG. 8 is a side view showing a schematic configuration of the robot 1F. In the following explanation, the explanation of the parts equal to those of the robot 1E will be omitted and the same signs will be attached to the parts in the drawings.

As shown in FIG. 8, the robot 1F of the embodiment has a configuration in which a serial signal line 40 is used for the above described first signal line 24 and the second signal line 25. The rest of the configuration is basically the same as that of the above described robot 1E.

In the case of using the serial signal line 40, the detection signals detected by the first detection unit 10 and the second detection unit 11 may be serial-transmitted to the drive control unit 12 via the single serial signal line 40. Therefore, in the robot 1F of the embodiment, the number of signal lines (wires) may be significantly reduced like the above described robot 1E.

A robot system 1000F of the embodiment includes the robot 1F, the robot controller 30, and the system controller 100.

Seventh Embodiment

Robot

Next, a robot 1G of the seventh embodiment will be explained with reference to FIG. 9.

Figure 9:
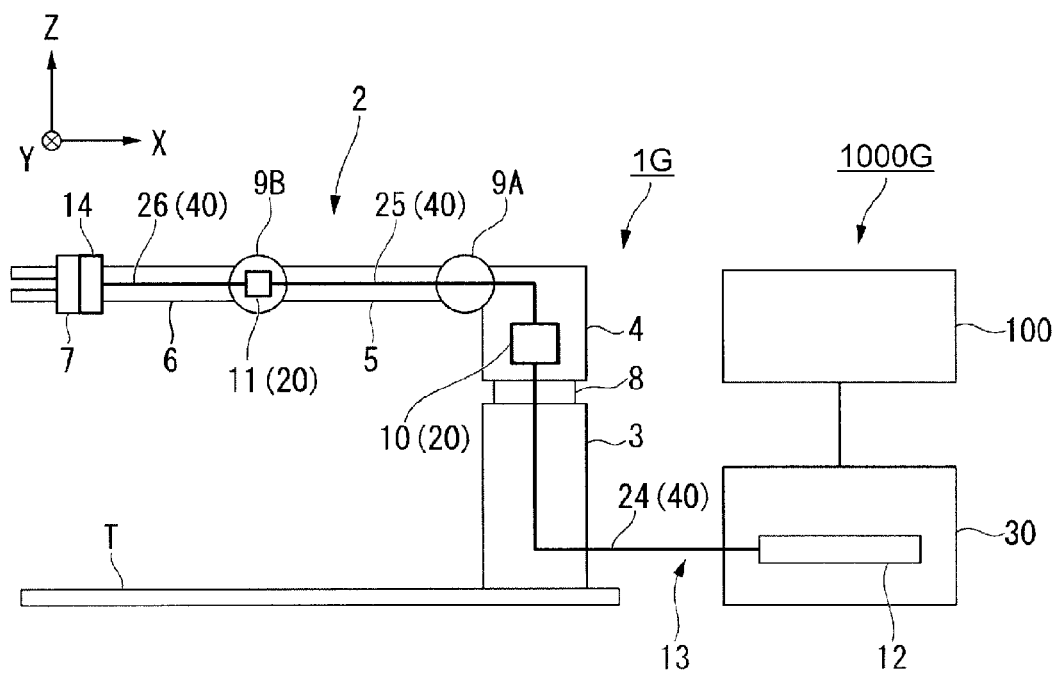
FIG. 9 is a side view showing a schematic configuration of a robot according to a seventh embodiment of the invention.

FIG. 9 is a side view showing a schematic configuration of the robot 1G. In the following explanation, the explanation of the parts equal to those of the robot 1E will be omitted and the same signs will be attached to the parts in the drawings.

As shown in FIG. 9, the robot 1G of the embodiment is different from the robot 1E in configuration of the robot arm 2. Specifically, the first arm unit 5 is coupled to the side surface of the torso unit 4 via a second joint unit 9A. Inside of the second joint unit 9A, a rotation drive mechanism (second drive unit) that rotationally drives the first arm unit 5 in the θX-direction (θY-direction) with respect to the torso unit 4 is provided (not shown in FIG. 9). The second arm unit 6 is coupled to the distal end of the first arm unit 5 via a third joint unit 9B. Inside of the third joint unit 9B, a rotation drive mechanism (third drive unit) that rotationally drives the second arm unit 6 in the θX-direction (θY-direction) with respect to the first arm unit 5 is provided (not shown in FIG. 9).

Further, the robot 1G of the embodiment has a third detection unit 14 in addition to the first detection unit 10 and the second detection unit 11. The third detection unit 14 is a force sensor (force detector) provided in the hand unit 7. The wiring unit 13 has a third signal line 26 in addition to the first signal line 24 and the second signal line 25. The third signal line 26 connects between the second detection unit and the third detection unit 14. Thereby, the first detection unit 10, the second detection unit 11, the third detection unit 14, and the drive control unit 12 are series-connected (daisy-chain-connected) via the first signal line 24, the second signal line 25, and the third signal line 26. The detection signals detected by the first detection unit 10, the second detection unit 11, and the third detection unit 14 are sequentially transmitted (serial-transmitted) to the drive control unit 12 via the wiring unit 13.

The rest of the configuration is basically the same as that of the above described robot 1E. In the robot 1G of the embodiment, even when the number of sensors (detection units) increases, the number of signal lines (wires) may be significantly reduced like the above described robot 1E.

A robot system 1000G of the embodiment includes the robot 1G, the robot controller 30, and the system controller 100.

Eighth Embodiment

Robot

Next, a robot 1H of the eighth embodiment will be explained with reference to FIG. 10.

Figure 10:
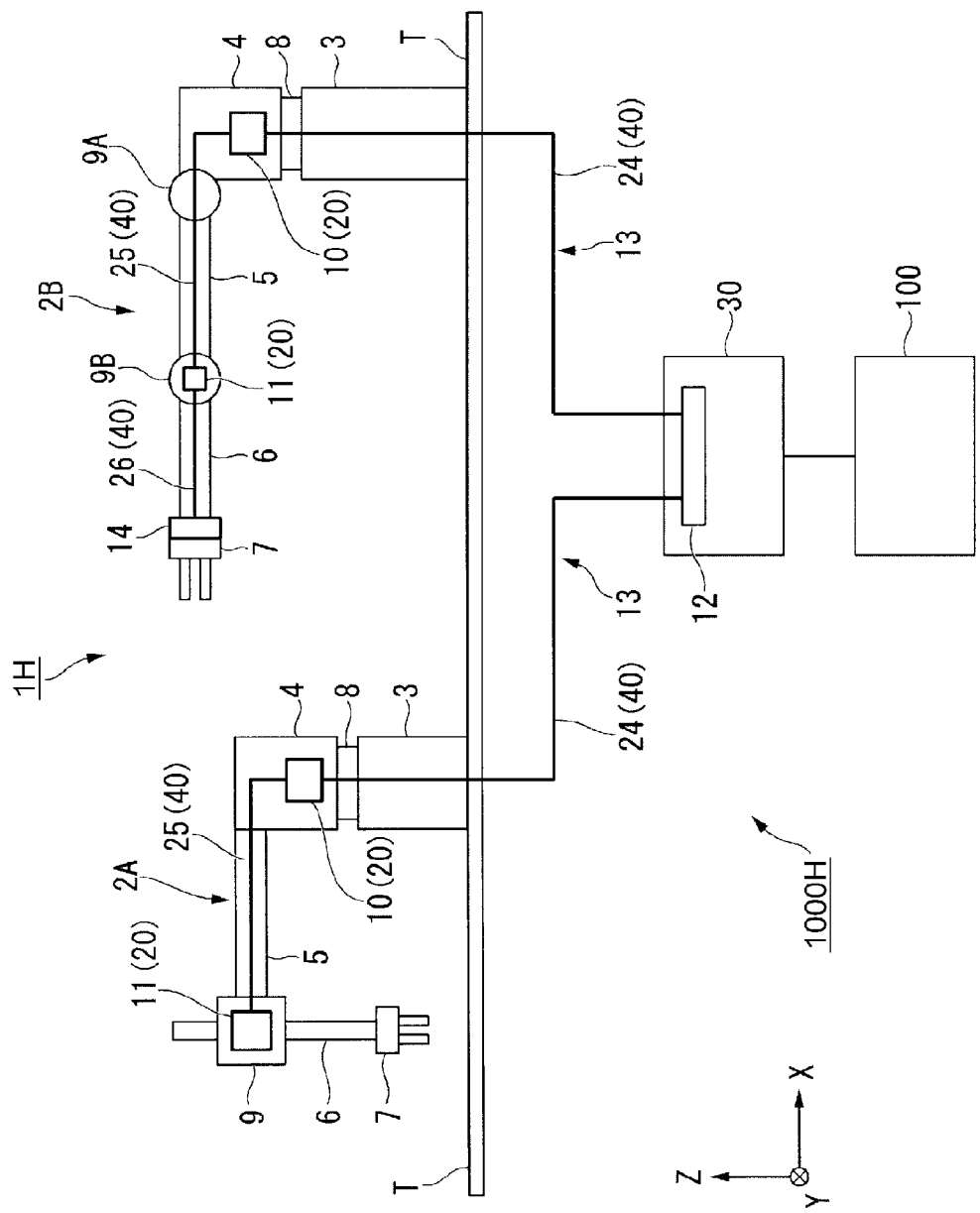
FIG. 10 is a side view showing a schematic configuration of a robot according to an eighth embodiment of the invention.

FIG. 10 is a side view showing a schematic configuration of the robot 1H. In the following explanation, the explanation of the parts equal to those of the robot 1E will be omitted and the same signs will be attached to the parts in the drawings.

As shown in FIG. 10, the robot 1H of the embodiment has a configuration in which a plurality of (two in the embodiment) robot arms 2A, 2B are provided. One robot arm 2A has the same configuration as the robot arm 2 shown in FIG. 8 and is connected to the robot controller 30 via the first signal line 24. The other robot arm 2B has the same configuration as the robot arm 2 shown in FIG. 9 and is connected to the robot controller 30 via the first signal line 24.

The rest of the configuration is basically the same as that of the above described robot 1E. In the robot 1H of the embodiment, even when the plurality of robot arms 2A, 2B are provided, the number of wires may be significantly reduced like the above described robot 1E.

A robot system 1000H of the embodiment includes the robot 1H, the robot controller 30, and the system controller 100.

Further, the invention is not necessarily limited to the above described embodiments, but various changes may be made without departing from the scope of the invention.

For example, the configuration of the robot arm 2 is not particularly limited, and the number, the type, etc. of the detection units may be changed according to the number, the type, etc. of the arm units, joint units, hand units, and the drive units. In this case, as in the cases of the embodiments, the same advantages as those of the embodiments may be obtained by daisy chain connection between the detection units and the drive control unit via the wiring unit.

Ninth Embodiment

Robot System

Figure 11:
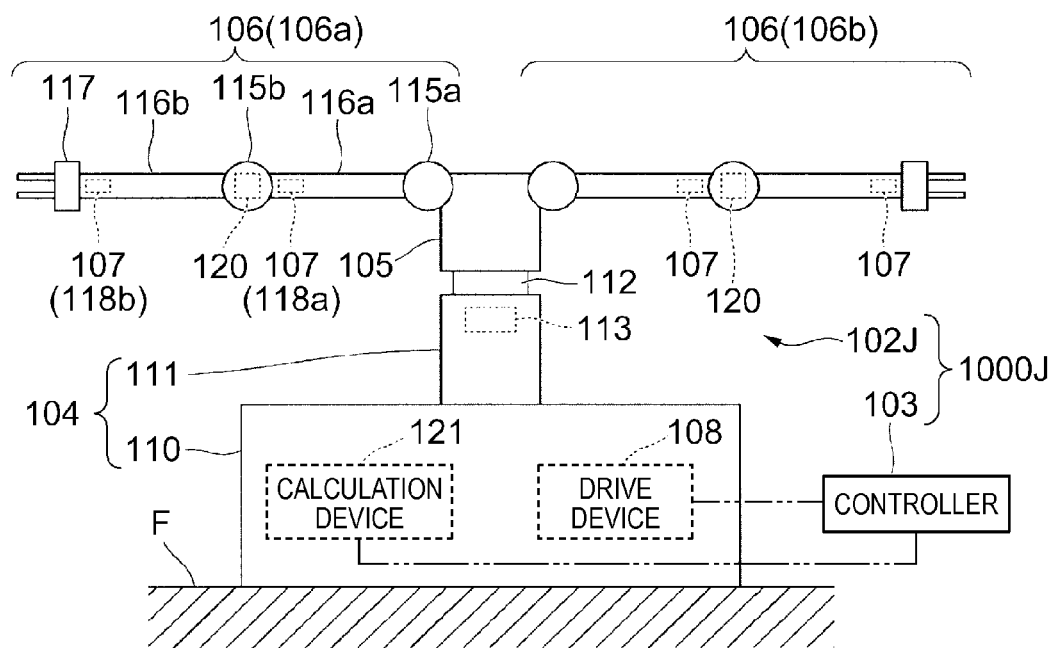
FIG. 11 shows a robot system according to a ninth embodiment of the invention.

FIG. 11 shows a robot system 1000J according to the ninth embodiment.

As shown in FIG. 11, the robot system 1000J of the embodiment includes a robot 102J, and a controller 103 that controls the robot 102J. For example, the robot system 1000J is installed in a factory for production of industrial products and used for at least part of assembly operation of the industrial products. The part of assembly operation may be performed by people and the robot 102J is installed in a space in which people may enter in the assembly operation.

The robot 102J includes a base 104, a torso 105 rotatably attached to the base 104, arms 106 attached to the torso 105 and being movable with respect to the torso, actuators 107 that move the arms 106, and a drive device 108 provided in the base 104 and driving the actuators 107.

The base 104 is installed on an installation surface F such as a floor of the factory and the ground. In FIG. 11, the base 104 is immovably fixed to the installation surface F. For example, the base 104 includes a base member 110 in contact with the installation surface F and a support member 111 provided on the base member 110. The base member 110 and the support member 111 respectively have box shapes having housing spaces inside. The space inside of the support member 111 communicates with the space inside of the base member 110.

The torso 105 is attached to the base 104 via a waist pivot 112 and rotatable with respect to the base 104 in the circumferential direction of the waist pivot 112. The waist pivot 112 has a hollow tubular shape extending in the vertical direction and is rotatably supported by the support member 111 of the base 104. An actuator 113 is provided in the support member 111, and the waist pivot 112 rotates by torque supplied from the actuator 113.

The robot 102J in FIG. 11 is the so-called dual-arm robot, and the arms 106 includes an arm 106a and an arm 106b. The arm 106a and the arm 106b are respectively movable with respect to the torso 105. In FIG. 11, the arm 106b is symmetrically provided to the arm 106a with respect to the torso 105, and has the same structure as the arm 106a. Accordingly, here, the structure of the arm 106a is representatively explained and the explanation of the arm 106b is simplified or omitted.

The arm 106a is attached to the torso 105 via a first joint unit 115a. The arm 106a is the so-called articulated robot arm and movable with respect to the torso 105 in a multi-degree-of-freedom system. The arm 106a includes a first arm unit 116a with one end connected to the first joint unit 115a, a second joint unit 115b connected to the other end of the first arm unit 116a, a second arm unit 116b connected to the second joint unit 115b, and a hand 117 attached to the distal end of the second arm unit 116b.

The arm 106a may move the hand 117 to a desired position within a movable range and execute various kinds of processing with the hand 117. For example, in the case where the robot 102J is used for assembly operation, the hand 117 executes processing of moving a part to be processed to a predetermined position while grasping it.

The arm 106a moves by utilities supplied from the actuators 107. In FIG. 11, the actuators 107 include an engine 118a and an engine 118b. The respective engines 118a and 118b generate the utilities by electric power, and supply the utilities to the respective parts of the arm 106a.

Each of the engines 118a and 118b includes, e.g., a power source such as a motor and a power transmission unit such as a gearbox. The engine 118a is provided in the first arm unit 116a and supplies the utility for moving the second arm unit 116b around the second joint unit 115b. The engine 118b is provided in the second arm unit 116b and supplies the utility for moving the hand 117 with respect to the second arm unit 116b.

The drive device 108 is a power supply device including a power supply circuit containing at least one of an inverter and a converter, a cooler that cools the power supply circuit, a transformer that transforms externally supplied power, etc, for example. The drive device 108 transforms externally supplied power (voltage, current) into power (voltage, current) necessary in the actuators 107, and supplies the transformed power to the actuators 107. An actuator for moving the first arm unit 116a of the arm 106a with respect to the torso 105 is provided in the torso 105, and the drive device 108 also supplies power consumed in the actuator.

The power supplied to the drive device 108 is power from a commercial power source of a power company or the like, for example, however, may include at least one of power from a power generator provided in the factory and power from a capacitor provided in the robot 102J.

The drive device 108 is housed inside of the base member 110 of the base 104. The center of gravity of the drive device 108 is placed below the center of gravity of the robot main body containing the base 104, the torso 105, and the arm 106 (near the installation surface F). The drive device 108 is electrically connected to each of the engine 118*a* and the engine 118*b* via power supply cables or the like. The power supply cables are routed from inside of the base 104 through the waist pivot 112 to the torso 105 and from the torso 105 through the arm 106*a* to the power sources (electric motors) of the engine 118*a* and the engine 118*b*.

A first detector 120 that detects position information of the arm 106*a* is provided in the arm 106*a*. Further, a calculation device 121 that calculates the position information of the arm 106*a* is housed in the base member 110 of the base 104. The calculation device 121 calculates the position information of the arm 106*a* using a result detected by the first detector 120.

The first detector 120 includes a motion sensor that detects information for feedback to control calculation of the arm 106*a*. The motion sensor includes, e.g., an angle sensor such as a rotary encoder, a resolver, or a gyro sensor, and an inertial sensor such as an acceleration sensor. In the embodiment, the first detector 120 includes a gyro sensor as the motion sensor and detects position information representing an angle change (posture change) of the arm 106*a*. The first detector 120 is connected to the calculation device 121 via communication cables or the like and transmits a detection result to the calculation device 121. For example, the communication cables are routed from the first detector 120 through the arm 106*a* to the torso 105 and from the torso 105 through the waist pivot 112 and the base 104 to the calculation device 121.

The calculation device 121 is a calculator that executes the so-called servo calculation and includes a calculation circuit etc. The calculation device 121 includes hardware that can perform calculation such as an ASIC, an FPGA, an SoC, a microcomputer, and a CPU, for example. The center of gravity of the calculation device 121 is placed below the center of gravity of the robot main body containing the base 104, the torso 105, and the arm 106 (near the installation surface F).

The calculation device 121 calculates an estimate value of the position of the arm 106*a* using the detection result from the first detector 120. For example, the calculation device 121 receives angle information representing an angular velocity of the arm 106*a* from the first detector 120 and integrates the angular velocity, and thereby, calculates the rotational position of the arm 106*a*. Further, the calculation device 121 compares the estimate value and a target value of the position of the arm 106*a*, and thereby, calculates a control quantity for moving the arm 106*a* to a target position.

In the embodiment, schedule information representing the target position of the arm 106*a* at each time during motion of the robot 102J is supplied from the controller 103. The calculation device 121 calculates a target value (control quantity) of the power supplied from the drive device 108 to the actuators 107 as the drive quantity necessary for moving the arm 106*a* to the target position based on the schedule information supplied from the controller 103. The calculation device 121 outputs the target value of the supplied power to the drive device 108 and the drive device 108 drives the actuators 107 according to the target value of the supplied power. For example, the calculation device 121 outputs a voltage waveform for moving the arm 106*a* to the drive device 108, and the drive device 108 appropriately amplifies the voltage waveform from the calculation device 121 and supplies it to the actuators 107. As described above, the calculation device 121 is a controller within the robot 102J and contributes to at least part of the control of the arm 106*a*.

For example, the controller 103 includes a computer having a CPU and a storage area such as a memory. In the computer, for example, a storage device such as a hard disc, an input device such as a keyboard, a display, etc. are provided. In the storage device of the controller 103, a program for allowing the robot 102J to execute predetermined processing is stored. In the program, for example, schedules in which positions and motions of the arm 106*a* at the respective times of assembly operation are specified are prescribed. The controller 103 supplies the schedule information representing the target positions of the arm 106*a* at the respective times to the calculation device 121 according to the schedule. The arm 106*a* is controlled to execute predetermined operation in the target position by control of the drive device 108 by the calculation device 121 based on the schedule information. The controller 103 monitors the drive device 108 and appropriately controls on and off of the operation. An operator may allow the storage device to store the schedule information using the input device of the controller 103 and confirms an operation status of the robot system 1000J using the display.

In the robot 102J of the embodiment having the above described configuration, the drive device 108 is provided on the base 104 and the torso 105 may be reduced in size and weight compared to the configuration in which the drive device 108 is provided in the torso 105. In the robot 102J, the inertia moment of the torso 105 may be reduced, and thereby, the convenience is improved so that the utility for moving the torso 105 with respect to the base 104 may be reduced and the time taken for acceleration and deceleration of the torso 105 may be shortened.

Now, the robot 102J may be used indoors in common with the space for assembly operation by the operator. In this case, the operator may enter the movable range of the arm 106*a* during motion of the arm 106*a*. The arm 106*a* in the embodiment has lower rigidity than the torso 105 and the base 104 in order to suppress occurrence of accidents due to collision with the operator, for example. Generally, as the rigidity of the arm is lower, the vibration of the arm is harder to be settled. However, in the embodiment, the calculation device 121 performs servo calculation based on the detection result of the first detector 120 (gyro sensor), and thereby, may suppress the vibration of the arm 106*a*. As a result, the robot 102J may control the position of the arm 106*a* with higher accuracy.

In the robot 102J according to the embodiment, the drive device 108 is housed inside of the base 104 and may be space-saving and the interference and the collision of the drive device 108 with the outside (e.g., the operator) may be avoided. Further, in the robot 102J, the calculation device 121 is housed inside of the base 104 and may be space-saving and the interference and the collision of the calculation device 121 with the outside (e.g., the operator) may be avoided.

In the robot 102J according to the embodiment, the center of gravity of the drive device 108 is placed below the center of gravity of the robot main body, and thus, the center of gravity of the whole robot may be lower and stably installed on the installation surface F. Further, in the robot 102J, the center of gravity of the calculation device 121 is placed below the center of gravity of the robot main body, and thus, the center of gravity of the whole robot may be lower and stably installed on the installation surface F.

The controller 103 according to the embodiment may control the position of the torso 105 of the robot 102J with higher accuracy and control the positions of the arms 106a, 106b attached to the torso 105 with higher accuracy. As a result, the convenience of the robot 102J is improved. The robot system 1000J according to the embodiment may control the position of the torso 105 with higher accuracy and control the positions of the arms 106a, 106b attached to the torso 105 with higher accuracy, and the convenience is improved.

Tenth Embodiment

Robot System

Next, a robot system of the tenth embodiment will be explained with reference to FIG. 12. In the embodiment, the same configurations as those of the above described ninth embodiment have the same signs and their explanation will be simplified or omitted.

Figure 12:
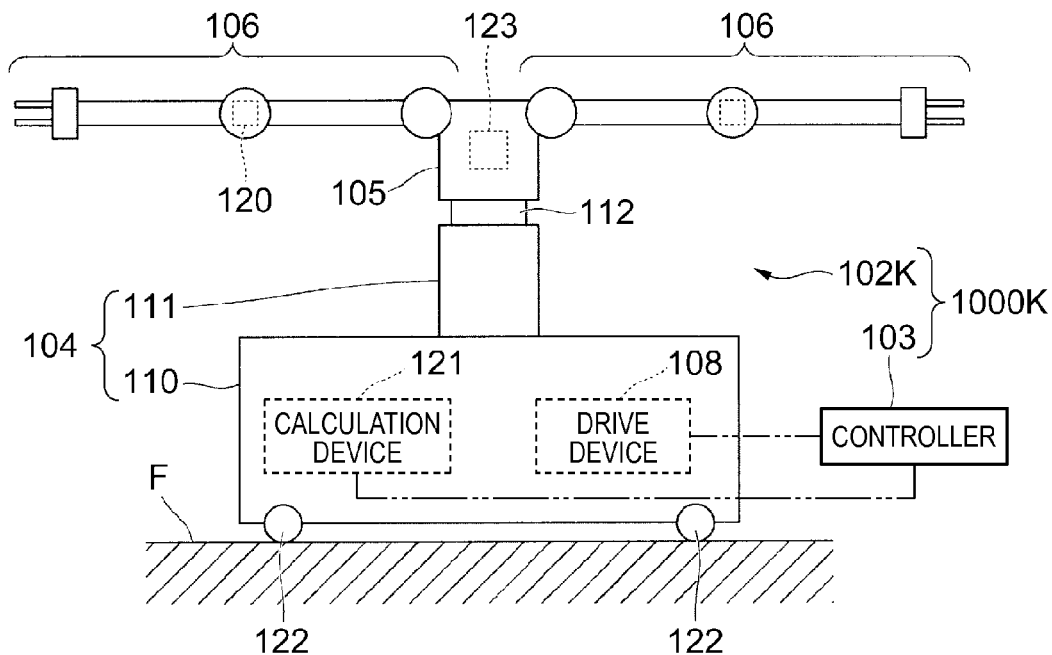
FIG. 12 shows a robot system according to a tenth embodiment of the invention.

FIG. 12 shows a robot system 1000K according to the tenth embodiment.

As shown in FIG. 12, the robot system 1000K of the embodiment includes a robot 102K and a controller 103 that controls the robot 102K. The robot 102K includes wheels 122 provided on the base 104 and is movable with respect to the installation surface F. The robot 102K may be movable by human power or self-propelled with a motor or the like provided therein. The robot 102K is easily installed and changed in installation position, and the convenience is improved. As described above, the robot 102K may take other forms than fixed to the installation surface F.

Further, the robot 102K of the embodiment includes a second detector 123 that detects position information of the torso 105. The second detector 123 includes a gyro sensor provided in the torso 105 and detects an angular velocity of the torso 105. The calculation device 121 calculates an estimate value (position information) of the position of the torso 105 using the result detected by the second detector 123. Further, the calculation device 121 calculates an estimate value (position information) of the position of the arm 106a using the estimate value of the position of the torso 105 and the detection result of the first detector 120. The robot 102K may suppress the vibration of the arms 106a, 106b and control the positions of the arms 106a, 106b with higher accuracy.

Eleventh Embodiment

Robot System

Next, a robot system of the eleventh embodiment will be explained with reference to FIG. 13. In the embodiment, the same configurations as those of the above described ninth embodiment have the same signs and their explanation will be simplified or omitted.

Figure 13:
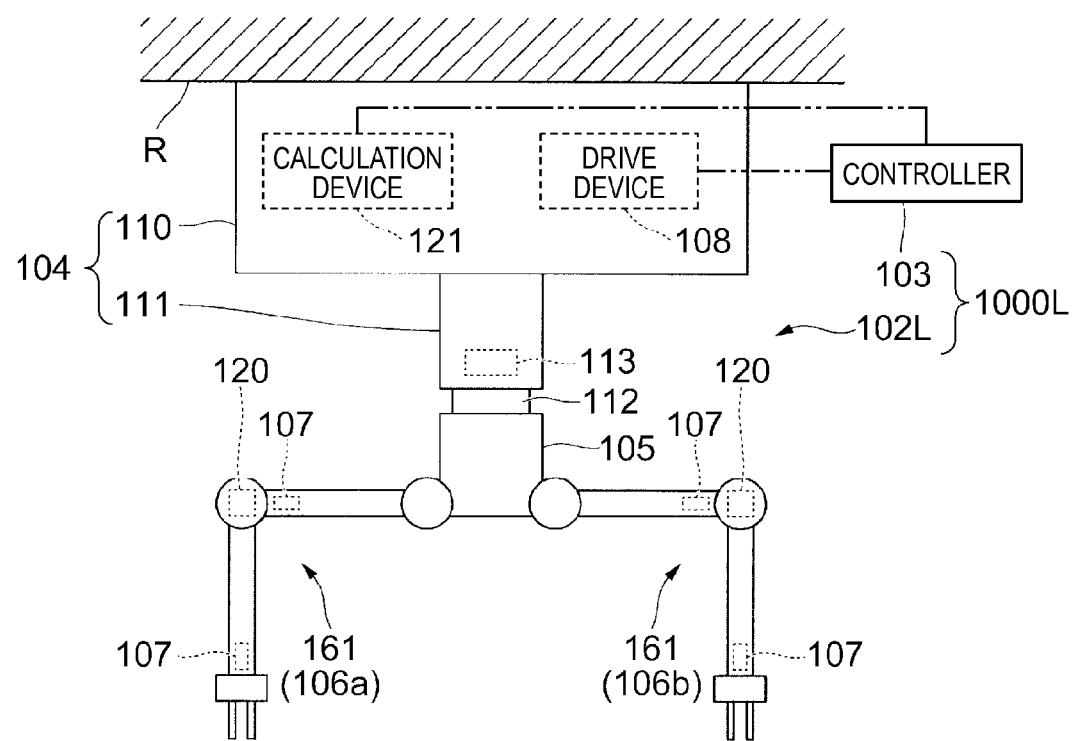
FIG. 13 shows a robot system according to an eleventh embodiment of the invention.

FIG. 13 shows a robot system 1000L according to the eleventh embodiment. As shown in FIG. 13, the robot system 1000L of the embodiment includes a robot 102L and a controller 103 that controls the robot 102L. The robot 102L of the embodiment is provided on an installation surface R such as a ceiling. In the robot 102L, the base 104 is fixed to the installation surface R and the torso 105 and the arms 106a, 106b extend vertically downward from the base 104. The robot 102L is installed on a surface vertically above, installed on a surface vertically below as is the above described ninth embodiment, or installed on a wall or the like. Further, the robot 102L may be supported by a crane provided on the installation surface R and movable by the crane.

Note that the technical scope of the invention is not limited to the ninth embodiment to the eleventh embodiment. The requirements explained in the ninth embodiment to the eleventh embodiment may be combined as appropriate. Further, at least one of the requirements explained in the ninth embodiment to the eleventh embodiment may be omitted. Various modifications may be made without departing from the scope of the invention.

In the above described ninth embodiment to the eleventh embodiment, the arms 106 include the plurality of arms (arm 106a, arm 106b), however, the number of arms provided in the robot 102 (collectively referring to the robots 102J, 102K, 102L) may be one, three, or more. Further, the plurality of arms 106 may be operable independently of one another and two or more of the plurality of arms 106 may move in conjunction with one another. The plurality of arms 106 may execute different processing with respect to each arm 106, two or more arms 106 may perform the same processing, or two or more arms 106 may cooperatively perform single processing.

In the above described ninth embodiment to the eleventh embodiment, the robot 102 executes at least part of the assembly operation and the hand 117 is used for moving the part to be processed, however, the processing executed by the hand 117 is not limited. Further, a processing unit that executes various kinds of processing, for example, a welding torch that executes welding processing, an application unit that applies an adhesive agent or the like may be provided in the hand 117.

In the above described ninth embodiment to the eleventh embodiment, the first detector 120 and the second detector 123 respectively include the gyro sensors, however, may include at least one of a position detector such as an optical or magnetic encoder and a speed detector such as an accelerometer or speedometer.

In the above described ninth embodiment to the eleventh embodiment, the robot 102 includes the calculation device 121, however, may not include the calculation device 121. For example, the calculation device may be a digital calculator including software and part of the controller 103. Further, the controller 103 may be built in the robot 102. For example, at least a part (e.g., the calculation part) of the controller 103 may be housed in the base 104, or a command or the like may be input to the controller 103 via an input device such as a touch panel. The input device may be attached to the base 104 or provided in a position apart from the base 104 in wired or wireless connection to the controller 103.

Twelfth Embodiment

Robot System

Figure 14:
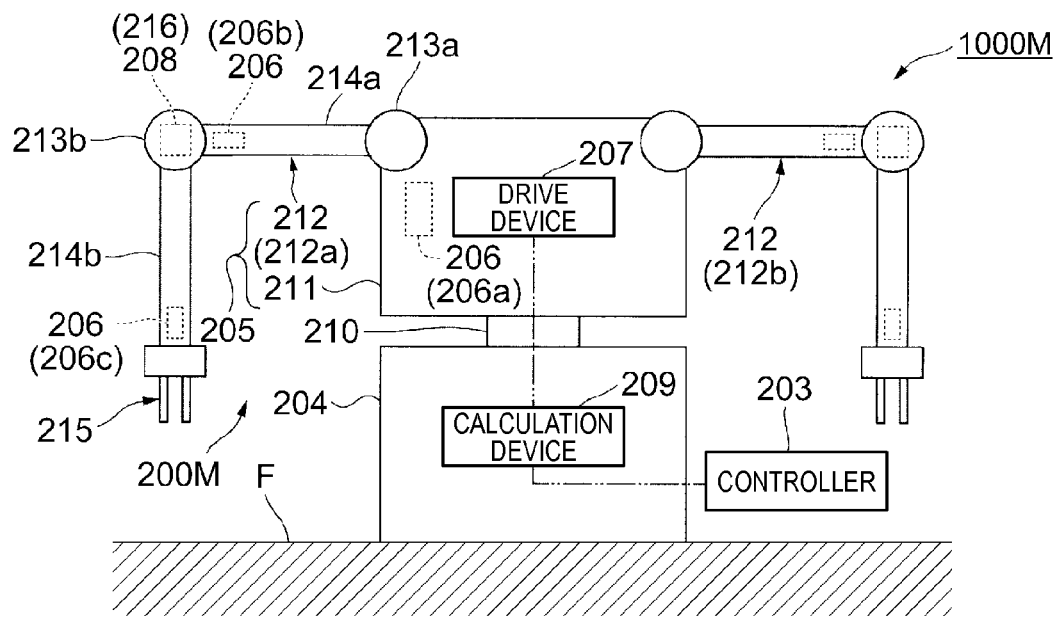
FIG. 14 shows a robot system according to a twelfth embodiment of the invention.

FIG. 14 shows a robot system 1000M according to the twelfth embodiment.

As shown in FIG. 14, the robot system 1000M of the embodiment includes a robot 200M and a controller 203 that controls the robot 200M. The robot system 1000M is installed in a factory for production of industrial products and used for at least part of assembly operation of the industrial products. The part of assembly operation may be performed by people and the robot 200M is installed in a space in which people may enter in the assembly operation.

The robot 200M includes a base 204, a movable unit 205 rotatably provided on the base 204, actuators 206 that move the movable unit 205, and a drive device 207 that drives the actuators 206, an angular velocity detection device 208 provided in the movable unit 205 and detecting the motion of the movable unit 205, and a calculation device 209 that calculates information of the position of the movable unit 205 using the detection result of the angular velocity detection device 208.

The base 204 is installed on an installation surface F such as a floor of the factory and the ground. In FIG. 14, the base 204 is in contact with the installation surface F and immovably fixed to the installation surface F. The base 204 has a box shape with a housing space inside.

The movable unit 205 includes a torso 211 connected to the base 204 via a waist pivot 210 and arms 212 attached to the torso 211. The torso 211 is rotatable with respect to the base 204 in the circumferential direction of the waist pivot 210. The waist pivot 210 has a hollow cylindrical shape extending in the vertical direction and is rotatably supported on the base 204.

The robot 200M in FIG. 14 is the so-called dual-arm robot, and the arms 212 include an arm 212a and an arm 212b. The arm 212a and the arm 212b are respectively movable with respect to the torso 211. In FIG. 14, the arm 212b is symmetrically provided to the arm 212a with respect to the torso 211, and has the same structure as the arm 212a. Accordingly, the structure of the arm 212a will be representatively explained and the explanation of the arm 212b will be simplified or omitted.

The arm 212a is attached to the torso 211 via a first joint unit 213a. The arm 212a is the so-called articulated robot arm and movable with respect to the torso 211 in a multi-degree-of-freedom system. The arm 212a includes a first arm unit 214a with one end connected to the first joint unit 213a, a second joint unit 213b connected to the other end of the first arm unit 214a, a second arm unit 214b connected to the second joint unit 213b, and a hand 215 attached to the distal end of the second arm unit 214b.

The arm 212a may move the hand 215 to a desired position within a movable range and execute various kinds of processing with the hand 215. For example, in the case where the robot 200M is used for assembly operation, the hand 215 executes processing of moving a part to be processed to a predetermined position while grasping it.

The movable unit 205 moves by utilities supplied from the actuators 206. In FIG. 14, the actuators 206 include an engine 206a, an engine 206b, and an engine 206c. The respective engines generate the utilities by electric power, and supply the utilities to the respective parts of the movable unit 205. Each of the engines includes, e.g., a power source such as an electric motor and a power transmission unit such as a gearbox.

The engine 206a is provided in the torso 211 and supplies the utility for moving the torso 211 in the circumferential direction of the waist pivot 210. The engine 206b is provided in the first arm unit 214a and supplies the utility for moving the second arm unit 214b around the second joint unit 213b. The engine 206c is provided in the second arm unit 214b and supplies the utility for moving the hand 215 with respect to the second arm unit 214b.

The drive device 207 is a power supply device including a power supply circuit containing at least one of an inverter and a converter, a cooler that cools the power supply circuit, a transformer that transforms externally supplied power, etc, for example. The drive device 207 transforms externally supplied power (voltage, current) into power (voltage, current) necessary in the actuators 206, and supplies the transformed power to the respective power sources of the actuators 206.

The power supplied to the drive device 207 is power from a commercial power source of a power company or the like, for example, however, may include at least one of power from a power generator provided in the factory and power from a capacitor provided in the robot 200M.

The drive device 207 is housed inside of the torso 211. The drive device 207 is electrically connected to each of the engine 206a, the engine 206b, and the engine 206c via power supply cables or the like. One of the power supply cables connects the drive device 207 to the power source (electric motor) of the engine 206a within the torso 211. Further, the other power supply cables are routed from the torso 211 through the arm 212a to the respective power sources (electric motors) of the engine 206b and the engine 206c. An engine (actuator 206) for moving the first arm unit 214a of the arm 212a with respect to the torso 211 is provided in the torso 211, and the drive device 207 also supplies power consumed in the engine.

A detector 216 (angular velocity detection device 208) that detects motion of the arm 212a is provided in the arm 212a. The calculation device 209 calculates information of the position of the arm 212a using the detection result of the detector 216. The detector 216 includes a motion sensor that detects information for feedback to control calculation of the position of the arm 212a. The motion sensor includes, e.g., an angle detector such as a rotary encoder, a resolver, or a gyro sensor.

In the embodiment, the detector 216 includes an angular velocity detector such as a gyro sensor as the motion sensor and detects position information representing an angle change (posture change) of the arm 212a. The detector 216 is connected to the calculation device 209 via communication cables or the like and transmits a detection result to the calculation device 209. For example, the communication cables are routed from the detector 216 through the arm 212a and the torso 211 to the calculation device 209.

The calculation device 209 is a calculator that executes the so-called servo calculation and includes a calculation circuit etc. The calculation device 209 includes hardware (calculation circuit) that can perform calculation such as an ASIC, an FPGA, an SoC, and a microcomputer, for example. The calculation device 209 may include a digital calculator including software. For example, the calculation device 209 may allow a computer including a CPU and a memory to execute various kinds of calculation using programs.

The calculation device 209 calculates an estimate value of the position of the arm 212a using the detection result from the detector 216. For example, the calculation device 209 receives angle information representing an angular velocity of the arm 212a from the detector 216 and integrates the angular velocity, and thereby, calculates the rotational position of the torso 211. Further, the calculation device 209 compares the estimate value and a target value of the position of the arm 212a, and thereby, calculates a control quantity for moving the torso 211 to a target position.

In the embodiment, schedule information representing the target position of the arm 212a at each time during motion of the robot 200M is supplied from the controller 203. The schedule information includes torso position information representing the target positions of the torso 211 at the respective times and arm position information of relative target positions of the arm 212a with respect to the torso 211 at the respective times, for example.

The calculation device 209 calculates a target value (control quantity) of the power supplied from the drive device 207 to the actuators 206 as the drive quantity necessary for moving the torso 211 to the target position based on the torso position information of the schedule information supplied from the controller 203. The calculation device 209 outputs the target value of the supplied power to the drive device 207 and the drive device 207 drives the engine 206a of the actuator 206 according to the target value of the supplied power. For example, the calculation device 209 outputs a voltage waveform for moving the torso 211 to the drive device 207, and the drive device 207 appropriately amplifies the voltage waveform from the calculation device 209 and supplies it to the engine 206a of the actuator 206. With respect to the arm 212b, similarly, the calculation device 209 calculates target values (control quantities) of the supplied power from the drive device 207 to the respective engine 206b and the engine 206c of the actuators 206 as drive quantities necessary for moving the arm 212b to a target position based on the arm position information of the schedule information supplied from the controller 203.

For example, the controller 203 includes a computer having a CPU and a storage area such as a memory. In the computer, for example, a storage device such as a hard disc, an input device such as a touch panel and a keyboard, a display device such as a liquid crystal panel, etc. are provided. At least part of the controller 203 may be provided outside of the robot 200M or provided in the robot 200M. For example, the display device and the input device of the controller 203 may be provided on the base 204, and an operator may operate the robot 200M by inputting commands as appropriate from the input device while watching the display device.

In the storage device of the controller 203, a program for allowing the robot 200M to execute predetermined processing is stored. In the program, for example, schedules in which positions and motions of the arms 212a, 212b at the respective times of assembly operation are specified are prescribed. The controller 203 supplies the schedule information representing the target positions of the arms 212a, 212b at the respective times to the calculation device 209 according to the schedule. The arms 212a, 212b are controlled to execute predetermined operation in the target positions by control of the drive device 207 by the calculation device 209 based on the schedule information.

The controller 203 monitors the drive device 207 and appropriately controls on and off of the operation. An operator may allow the storage device to store the schedule information using the input device of the controller 203 and confirms an operation status of the robot system 1000M using the display.

In the embodiment, the movable unit 205 is cantilevered and supported by the base 204 via the waist pivot 210. The center of gravity of the torso 211 comes closer toward the free end side with respect to the point of support when parts including the drive device 207 are mounted on the movable unit 205. Generally, as the center of gravity is farther from the point of support, swing is easier to occur, and thus, when the parts mounted on the movable unit 205 increase, the movable unit 205 is easier to swing.

However, the robot 200M of the embodiment performs servo calculation using the detection result of the angular velocity detection device 208, and the swing of the movable unit 205 may be reduced or cancelled. That is, in the embodiment, the calculation device 209 executes the servo calculation on the motion of the arms 212 using the detection results of the detectors 216 provided in the arms 212, and the swing of the arms 212 is reduced. As a result, the robot 200M may control the positions of the arms 212 (212a, 212b) with higher accuracy.

Now, the robot 200M may be used indoors in common with the space for assembly operation by the operator. In this case, the operator may enter the movable range of the arms 212 during motion of the arms 212. The arms 212 in the embodiment have lower rigidity than the torso 211 and the base 204 in order to suppress occurrence of accidents due to collision with the operator, for example. Generally, as the rigidity of the arm is lower, the swing of the arm is harder to be settled. However, in the embodiment, the calculation device 209 performs servo calculation based on the detection result of the detector 216 (gyro sensor), and thereby, may suppress the swing of the arms 212 (212a, 212b). As a result, the robot 200M may control the positions of the arms 212 (212a, 212b) with higher accuracy.

The controller 203 according to the embodiment may control the positions of the arms 212 (212a, 212b) with higher accuracy, and thus, may allow the robot 200M to efficiently execute processing. The robot system 1000M according to the embodiment may control the position of the torso 211 with higher accuracy and control the positions of the arms 212 (212a, 212b) attached to the torso 211 with higher accuracy, and thus, may efficiently execute processing.

Thirteenth Embodiment

Robot System

Next, a robot system of the thirteenth embodiment will be explained with reference to FIG. 15. In the embodiment, the same configurations as those of the above described twelfth embodiment have the same signs and their explanation will be simplified or omitted.

Figure 15:
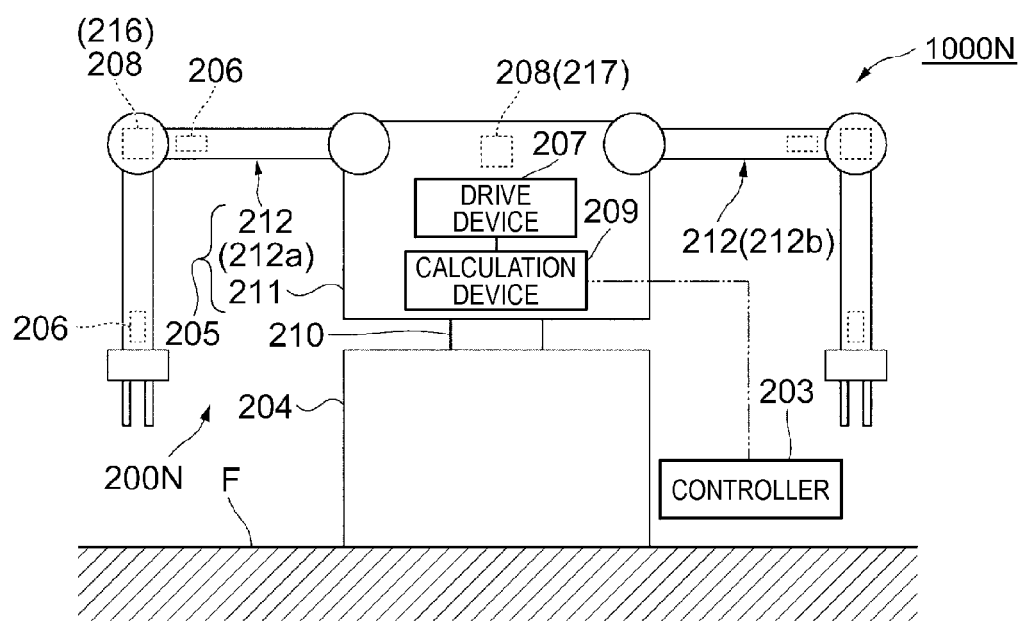
FIG. 15 shows a robot system according to a thirteenth embodiment of the invention.

FIG. 15 shows a robot system 1000N according to the thirteenth embodiment. As shown in FIG. 15, the robot system 1000N of the embodiment includes a robot 200N and a controller 203 that controls the robot 200N. In the embodiment, the calculation device 209 is provided in the torso 211. The calculation device 209 is connected to the drive device 207 by a communication cable or the like routed inside of the torso 211. The robot 200N may connect the drive device 207 to the calculation device 209 not via the waist pivot 210, and twist of the communication cable due to rotation of the torso 211 may be avoided compared to the configuration in which the calculation device 209 is provided in the base 204.

The calculation device 209 is in wired or wireless connection to the controller 203 and can receive control information including schedule information from the controller 203. Here, the control information from the controller 203 is stored in a storage device provided in the calculation device 209. The robot 200N may execute a series of processing according to the control information stored in the storage device at a predetermined number of times without the connection between the calculation device 209 and the controller 203. That is, it is not necessary that the calculation device 209 is in wired connection to the controller 203 during execution of processing, however, the robot 200N may execute processing with connection of the communication cable from the calculation device 209 to the controller 203 via the inside of the waist pivot 210 and the base 204, for example.

In the embodiment, a detector 217 (angular velocity detection device 208) that detects motion of the torso 211 is provided in the torso 211. The calculation device 209 calculates information of the position of the torso 211 using the detection result of the detector 217. The detector 217 includes a motion sensor that detects information for feedback to control calculation of the position of the torso 211 like the detector 216 explained in the twelfth embodiment.

In the embodiment, the detector 217 includes a gyro sensor as an angular velocity detector and detects position information representing an angle change (posture change) of the torso 211. The detector 217 may be externally attached to the torso 211 or housed inside of the torso 211. When the detector 217 is a gyro sensor and housed inside of the torso 211, if the detector 217 has concerns about being at a predetermined or higher temperature, for example, the detector 217 may be cooled using a cooler of the drive device 207, for example.

The detector 217 is connected to the calculation device 209 via communication cables or the like and transmits a detection result to the calculation device 209. The calculation device 209 calculates an estimate value of the position of the torso 211 using the detection result from the detector 217, compares the estimate value and a target value of the position of the torso 211, and thereby, calculates a control quantity for moving the torso 211 to a target position like the servo calculation of the arms 212.

As described above, the calculation device 209 executes servo calculation on the motion of the torso 211 using the detection result of the detector 217 provided in the torso 211, and thus, swing of the torso 211 is reduced. As a result, the swing of the arms 212 (212a, 212b) attached to the torso 211 is reduced, and the robot 200N may control the positions of the arms 212 (212a, 212b) with higher accuracy.

Fourteenth Embodiment

Robot System

Next, a robot system of the fourteenth embodiment will be explained with reference to FIG. 16. In the embodiment, the same configurations as those of the above described twelfth embodiment have the same signs and their explanation will be simplified or omitted.

Figure 16:
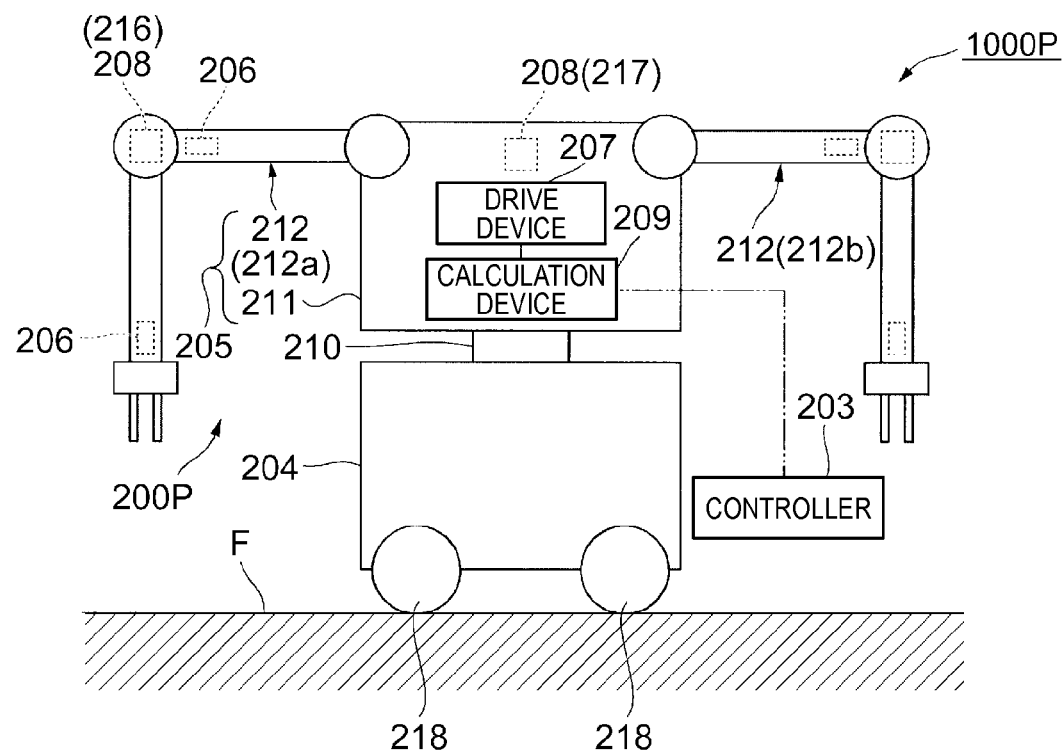
FIG. 16 shows a robot system according to a fourteenth embodiment of the invention.

FIG. 16 shows a robot system 1000P according to the fourteenth embodiment. In the above described twelfth embodiment and the thirteenth embodiment, the base 204 is fixed to the installation surface F, however, in the robot system 1000P of the embodiment shown in FIG. 16, the base 204 is movable with respect to the installation surface F.

In the embodiment, a robot 200P includes rolling members 218 such as wheels, for example. The rolling members 218 are provided rollably on the base 204 and in contact with the installation surface F in the smaller area than that of the bottom surface of the base 204. The base 204 translates with respect to the installation surface F on which the base 204 is placed when the rolling members 218 roll. As described above, the robot main body including the base 204 and the movable unit 205 of the robot system 1000P is movable on the installation surface F by a smaller force compared to the configuration in which the bottom surface of the base 204 is in contact with the installation surface F. In the robot 200P, the rolling members 218 are locked not to roll and the base 204 is fixed not to move with respect to the installation surface F during execution of processing by the hand 215.

Further, in the robot 200P, the rolling members 218 are unlocked and the base 204 and the movable unit 205 are movable with respect to the installation surface F in a period in which processing is not executed by the hand 215.

The robot 200P according to the embodiment includes at least one of the drive device 207 and the calculation device 209 like the above described twelfth embodiment and the thirteenth embodiment, i.e., includes at least part of the controller. In addition, the robot 200P is movable on the installation surface F by the rolling members 218, and, for example, the installation position is easily changed and the convenience is improved.

Note that the rolling members 218 may take not only the forms of wheels but also forms of bearings and forms of endless belts such as caterpillars. The robot 200P may be movable (self-propelled) by driving of the rolling members 218, or movable by an external force of human power or the like, for example. For self-propelling of the robot 200P, for example, a drive unit for rolling the rolling members 218, a control unit that controls the drive unit, etc. are provided as appropriate. Further, the robot 200P in FIG. 16 is formed by application of the rolling members 218 to the robot 200N of the thirteenth embodiment shown in FIG. 15, however, the rolling members 218 may be applied to the robot 200M of the twelfth embodiment shown in FIG. 14.

Note that the technical scope of the invention is not limited to the twelfth embodiment to the fourteenth embodiment. The requirements explained in the twelfth embodiment to the fourteenth embodiment may be combined as appropriate. Further, at least one of the requirements explained in the twelfth embodiment to the fourteenth embodiment may be omitted.

In the above described twelfth embodiment to the fourteenth embodiment, the base 204 may be installed not only on a floor of a factory but also on a side wall or a ceiling. For example, the robot 200 (collectively referring to the robots 200M, 200N, 200P) may be installed on the ceiling and movable with respect to the ceiling by a crane.

In the above described twelfth embodiment to the fourteenth embodiment, the robot 200 executes at least part of the assembly operation and the hand 215 is used for moving the part to be processed, however, the processing executed by the hand 215 is not limited. Further, a processing unit that executes various kinds of processing, for example, a welding torch that executes welding processing, an application unit that applies an adhesive agent or the like may be provided in the hand 215.

In the above described twelfth embodiment to the fourteenth embodiment, the movable unit 205 includes the torso 211 and the arms 212, however, for example, the robot 200 may be a humanoid and a head may be provided in the movable unit 205. The head may be a part of the movable unit 205 separate from the torso 211 or a part of the torso 211. For example, the detector 217 that detects the motion of the torso 211 may be provided in the head.

In the above described twelfth embodiment to the fourteenth embodiment, the arms 212 include the plurality of arms (arm 212a and arm 212b), however, the number of arms 212 provided in the robot 200 may be one, three, or more. The plurality of arms 212 may be operable independently of one another and two or more of the plurality of arms 212 may move in conjunction with one another. The plurality of arms 212 may execute different processing with respect to each arm 212, two or more arms 212 may perform the same processing, or two or more arms 212 may cooperatively perform single processing.

In the above described twelfth embodiment to the fourteenth embodiment, the detector 216 and the detector 217 respectively include the gyro sensors, however, may include other angular velocity detectors. Further, the calculation device 209 may execute servo calculation using a detection result of at least one of a position detector such as an optical or magnetic encoder and a speed detector such as an accelerometer or speedometer in addition to the detection result of the angular velocity detector.

In the above described twelfth embodiment to the fourteenth embodiment, the drive device 207 is provided in the torso 211, however, the calculation device 209 may be provided in the torso 211 and the drive device 207 may be provided in another part than the torso 211, for example, in the base 204. In this case, the calculation device 209 is provided in the torso 211, and thereby, the movable unit 205 may be easier to swing due to increase in size and weight of the movable unit 205. However, the swing of the movable unit 205 may be reduced by servo calculation using the detection result of the angular velocity detection device 208. As described above, the robot 200 may take a form in which the drive device 207 and the calculation device 209 are provided in the movable unit 205, a form in which the drive device 207 is provided in the movable unit 205, but the calculation device 209 is not provided in the movable unit 205, or a form in which the drive device 207 is not provided in the movable unit 205, but the calculation device 209 is provided in the movable unit 205. Further, at least part of the engine 206a (see FIG. 14) that supplies the utility for rotating the torso 211 with respect to the base 204 may be provided in the base 204.

The entire disclosures of Japanese Patent Application Nos. 2013-227972, filed Nov. 1, 2013; 2013-227973, filed Nov. 1, 2013; 2013-229061; filed Nov. 5, 2013, 2013-229062; filed Nov. 5, 2013; and 2014-005697, filed Jan. 16, 2014 are expressly incorporated by reference herein.

What is claimed is:

1. A robot comprising:
a robot arm having a hand unit;
an illumination device mounted on the hand unit;
an imaging device mounted on the robot arm;
a driver driving the robot arm;
a first controller communicating with the driver and controlling drive of the driver;
a second controller communicating with an end effector provided on a hand of the robot arm and controlling drive of the end effector;
an inertial sensor provided in the robot arm; and
a single wiring that series-connects the illumination device or the imaging device to the second controller, the second controller to the inertia sensor, and the inertia sensor to the first controller,
wherein the imaging device is electrically connected to the second controller.

2. The robot according to claim 1, further comprising a force detector provided in the robot arm,
wherein the wiring series-connects the first controller, the second controller, the inertial sensor, and the force detector.

3. A robot comprising:
a robot arm having a hand;
an illumination device mounted on the hand;
an imaging device mounted on the robot arm;
a driver driving the robot arm;
a first controller communicating with the driver and controlling drive of the driver;
a plurality of detectors for determining position and movement of the robot arm, wherein at least one of the detectors is an inertial sensor; and
a single wiring that series-connects the illumination device or the imaging device to the plurality of detectors, the plurality of detectors to each other, and the plurality of detectors to the first controller,
an end effector provided on a hand of the robot arm; and
a second controller communicating with the end effector and controlling drive of the end effector,
wherein the wiring series-connects the plurality of detectors, the first controller, and the second controller, and
wherein the imaging device is electrically connected to the second controller.

4. The robot according to claim 3, wherein at least one of the plurality of detectors is a force detector.

5. The robot according to claim 3, further comprising:
a monitor and commander that communicates with the second controller, sends commands to the second controller for controlling the end effector, and receives signals from the second controller regarding the position and movement of the end effector; and
a communication controller that sorts and interprets signals between the first controller and the monitor and commander,
wherein the wiring series-connects the plurality of detectors, the first controller, the second controller, and the communication controller.

6. The robot according to claim 3, comprising a plurality of the robot arms.

7. The robot according to claim 3, further comprising a system controller for sending commands to the first controller, a monitor and commander, and a communication controller for controlling movements of the robot arm and interpreting signals from the at least one inertial sensor.

8. A robot system comprising the robot according to claim 3 and a system controller, wherein the system controller communicates with a subordinate controller having the first controller, a monitor and commander, and a communication controller, the system controller sending commands to the first controller, the monitor and commander, and the communication controller for controlling movements of the robot arm and interpreting signals from the at least one inertial sensor.

* * * * *